(12) United States Patent
Katahira

(10) Patent No.: US 9,407,777 B2
(45) Date of Patent: Aug. 2, 2016

(54) IMAGE PROCESSING APPARATUS, METHOD OF CONTROLLING THE SAME, AND STORAGE MEDIUM

(75) Inventor: Yoshiaki Katahira, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1643 days.

(21) Appl. No.: 11/847,548

(22) Filed: Aug. 30, 2007

(65) Prior Publication Data

US 2008/0144120 A1 Jun. 19, 2008

(30) Foreign Application Priority Data

Dec. 18, 2006 (JP) ................................. 2006-340078

(51) Int. Cl.
*G06F 3/12* (2006.01)
*H04N 1/00* (2006.01)
*H04N 1/32* (2006.01)

(52) U.S. Cl.
CPC ......... *H04N 1/0035* (2013.01); *H04N 1/00437* (2013.01); *H04N 1/32502* (2013.01); *H04N 1/32529* (2013.01); *H04N 1/32539* (2013.01); *H04N 1/00347* (2013.01); *H04N 2201/0036* (2013.01); *H04N 2201/0087* (2013.01); *H04N 2201/0094* (2013.01); *H04N 2201/3205* (2013.01); *H04N 2201/3208* (2013.01); *H04N 2201/3209* (2013.01); *H04N 2201/3273* (2013.01)

(58) Field of Classification Search
CPC .................................................. H04N 1/32539
USPC .......................... 358/1.15, 400, 401; 711/115
See application file for complete search history.

(56) References Cited

U.S. PATENT DOCUMENTS

| 5,604,860 A * | 2/1997 | McLaughlin et al. ........ 715/866 |
| 6,735,665 B1 * | 5/2004 | Kumagai et al. .............. 711/101 |
| 2002/0003548 A1 * | 1/2002 | Krusche et al. ............... 345/736 |
| 2003/0103232 A1 * | 6/2003 | Twede ......................... 358/1.15 |

(Continued)

FOREIGN PATENT DOCUMENTS

| JP | 07-319740 A | 8/1995 |
| JP | 11-136477 A | 5/1999 |

(Continued)

OTHER PUBLICATIONS

Notification of the First Office Action issued in corresponding Chinese Patent Application No. 2007101471172 dated Jan. 8, 2010.

(Continued)

*Primary Examiner* — Marivelisse Santiago Cordero
*Assistant Examiner* — Neil R McLean
(74) *Attorney, Agent, or Firm* — Rossi, Kimms & McDowell LLP

(57) ABSTRACT

An image processing apparatus which makes it possible to further simplify operations for designating a removable storage medium as a transmission destination of image data. A scanner section reads an image from an original. A controller unit transmits image data of the image input by the scanner section. A USB host I/F detects mounting and removal of the removable memory. The controller unit causes information concerning transmission to the removable memory to be displayed on the operating section in preference to information concerning transmission by another transmission method, according to detection of mounting of the removable memory.

13 Claims, 21 Drawing Sheets

(56) References Cited

U.S. PATENT DOCUMENTS

| | | | |
|---|---|---|---|
| 2006/0085567 A1* | 4/2006 | Takada et al. | 710/15 |
| 2007/0033540 A1* | 2/2007 | Bridges et al. | 715/769 |
| 2008/0049267 A1* | 2/2008 | Okayama et al. | 358/474 |

FOREIGN PATENT DOCUMENTS

| | | | | |
|---|---|---|---|---|
| JP | 2000-013553 A | | 1/2000 | |
| JP | 2001-076107 A | | 3/2001 | |
| JP | 2004-015496 A | | 1/2004 | |
| JP | 2004015496 A | * | 1/2004 | ............... H04N 1/21 |
| JP | 2005-202813 A | | 7/2005 | |
| JP | 2006-033087 A | | 2/2006 | |
| JP | 2006033087 A | * | 2/2006 | |
| JP | 2006-056109 A | | 3/2006 | |

OTHER PUBLICATIONS

Office Action issued in corresponding Japanese Patent Application 2006-340078 dated Jun. 1, 2011.

* cited by examiner

FIG. 9

ADDRESS BOOK 5000

| ADDRESS BOOK NUMBER 5001 | ABBREVIATION 5002 | TRANSMISSION MODE 5003 | ADDRESS 5004 | PREFERENTIAL DISPLAY FLAG 5005 | DESTINATION SELECTION FLAG 5006 | DETAILED INFORMATION FLAG 5007 |
|---|---|---|---|---|---|---|
| 1 | Taro | FAX | 0445556666 | 0 | 0 | NULL |
| 2 | TERMINAL A | IFAX | 192.168.80.90 | 0 | 0 | NULL |
| 3 | Kosugi | Email | kosugi.???.co.jp | 0 | 0 | NULL |
| 4 | USB for Jiro | REMOVABLE MEMORY | USB¥5555,¥TEMP | 0 | 0 | 0x12345678 |
| ... | ... | ... | ... | ... | ... | ... |
| 101 | MADE BY xxx Inc. | REMOVABLE MEMORY | USB¥0120,¥¥IMG | 1 | 0 | 0x12345650 |
| 102 | MADE BY ?? Co.Ltd. | REMOVABLE MEMORY | USB¥3210,¥¥IMG | 1 | 0 | 0x12345660 |
| ... | ... | ... | ... | ... | ... | ... |

FIG. 10

REMOVABLE MEMORY INFORMATION
5100

| 5101 | 5102 | 5103 | 5104 | 5105 | 5106 | 5107 | 5108 |
|---|---|---|---|---|---|---|---|
| DRIVE NAME | HARDWARE ID | MANUFACTURER INFORMATION | WRITE EXECUTION COUNT | READ/PRINT EXECUTION COUNT | REMAINING MEMORY (MB) | STATUS INFORMATION | ADDRESS BOOK NUMBER INFORMATION |
| E | USB¥0120 | MADE BY xxx Co. | 0 | 0 | 1024 | NORMAL | 101 |
| F | USB¥3210 | MADE BY ?? Co Ltd | 2 | 1 | 2048 | ABNORMAL | 102 |
| G | USB¥5555 | MADE BY ?? Inc. | 2 | 0 | 1024 | NORMAL | 3 |

IMAGE PROCESSING APPARATUS, METHOD OF CONTROLLING THE SAME, AND STORAGE MEDIUM

BACKGROUND OF THE INVENTION

1. Field of the Invention

The present invention relates to an image processing apparatus having a function of storing image data in a removable storage medium, a method of controlling the same, and a storage medium.

2. Description of the Related Art

Conventionally, there has been proposed an image processing apparatus equipped with an image reading section for reading an image of an original, an image forming section for forming an image, and a connecting section for having an inexpensive and large-capacity removable storage medium mounted thereon and removed therefrom. An image processing apparatus of this kind is capable of storing image data read from originals in the removable storage medium, and reading image data from the removable storage medium, to form images on sheets (see e.g. Japanese Laid-Open Patent Publication (Kokai) No. 2005-202813).

In the conventional image processing apparatus, a storage function for storing image data read from an original in the removable storage medium is realized by enabling the removable storage medium to be selected as one of destinations to which image data captured by a scanner function or a copying function is delivered, or by displaying a screen dedicated to an operation for configuring the storage function.

This brings about the problems that image data is apt to be transmitted to a wrong destination due to an error in the operation by the user, and the operation for making use of the storage function is difficult to grasp. These problems become conspicuous particularly when a plurality of removable storage media are mounted on the image processing apparatus.

SUMMARY OF THE INVENTION

The present invention provides an image processing apparatus which makes it possible to further simplify operations for designating a removable storage medium as a transmission destination of image data, a method of controlling the same, and a storage medium.

In a first aspect of the present invention, there is provided an image processing apparatus on which a removable medium for storing image data can be mounted, comprising an input unit configured to input an image, a transmission unit configured to transmit image data of the image input by the input unit, a detector unit configured to detect mounting and removal of the removable medium, and a display control unit configured to display information concerning transmission to the removable medium in preference to information concerning transmission by another transmission method, according to detection of mounting of the removable medium by the detector unit.

With the configuration of the first aspect of the present invention, it is possible to simplify operations of the user for designating a removable storage medium as a destination of transmission of image data by the image processing apparatus.

Preferably, the display control unit can display information concerning the removable medium at a first position in a list of transmission destinations to which the transmission unit transmits the image data of the image input by the input unit, according to detection of mounting of the removable medium by the detector unit.

More preferably, the display control unit deletes display of the information concerning the removable medium from the list of transmission destinations, according to detection of removal of the removable medium by the detector unit.

The image processing apparatus further comprises an information storage unit configured to store information concerning a number of times of writing of image data in the removable medium after mounting of the removable medium, a number of times of reading of image data from the removable medium after the mounting of the removable medium, a remaining capacity of the removable medium, and a state of the removable medium, such that the information can be updated when the removable medium is mounted or removed, and a registration control unit configured to store information concerning the removable medium in the information storage unit, and register the information in an address book, according to detection of mounting of the removable medium by the detector unit, the registration control unit deleting the information concerning the removable medium from the information storage unit and the address book, according to detection of removal of the removable medium by the detector unit.

Preferably, when the display control unit displays information concerning the removable medium, the display control unit can display the information concerning the removable medium differently from normal display if a remaining capacity of the removable medium is smaller than a predetermined value, or if the removable medium is not in a normal state.

The image processing apparatus further comprises a selection unit configured to select a mode of transmission of the image data from modes of transmission including transmission to the removable medium, facsimile transmission, internet facsimile transmission, file transfer by FTP, and file transfer by SMB Preferably, when transmission of the image data by the transmission unit is selected, the display control unit can display the information concerning the transmission to the removable medium in preference to the information concerning the transmission by the other transmission method, according to detection of mounting of the removable medium by the detector unit.

Preferably, the input unit is a scanner for reading an image from an original.

Preferably, when the transmission to the removable medium and the transmission to an external device by the other transmission method are selected, the transmission unit can transmit the image data input by the input unit to the removable medium and the external device.

In a second aspect of the present invention, there is provided a method of controlling an image processing apparatus on which a removable medium for storing image data can be mounted, the image processing apparatus including an input unit configured to input an image, and a transmission unit configured to transmit image data of the image input by the input unit, the method comprising a detection step of detecting mounting and removal of the removable medium, and a display control step of displaying information concerning transmission to the removable medium in preference to information concerning transmission by another transmission method, according to detection of mounting of the removable medium in the detection step.

In a third aspect of the present invention, there is provided a storage medium storing a program for causing a computer to execute a method of controlling an image processing apparatus on which a removable medium for storing image data can be mounted, the image processing apparatus including an input unit configured to input an image, and a transmission unit configured to transmit image data of the image input by the input unit, the program comprising a detection module for detecting mounting and removal of the removable medium, and a display control module for displaying information concerning transmission to the removable medium in preference to information concerning transmission by another transmission method, according to detection of mounting of the removable medium by the detection module.

The above and other objects, features, and advantages of the invention will become more apparent from the following detailed description taken in conjunction with the accompanying drawings.

BRIEF DESCRIPTION OF THE DRAWINGS

FIG. 9 is a view of an address book held by the image processing apparatus.

FIG. 10 is a view of a format of removable memory information updated when a removable memory is mounted on or removed from the image processing apparatus.

DETAILED DESCRIPTION OF THE PREFERRED EMBODIMENTS

The present invention will now be described in detail below with reference to the accompanying drawings showing a preferred embodiment thereof.

Figure 1:
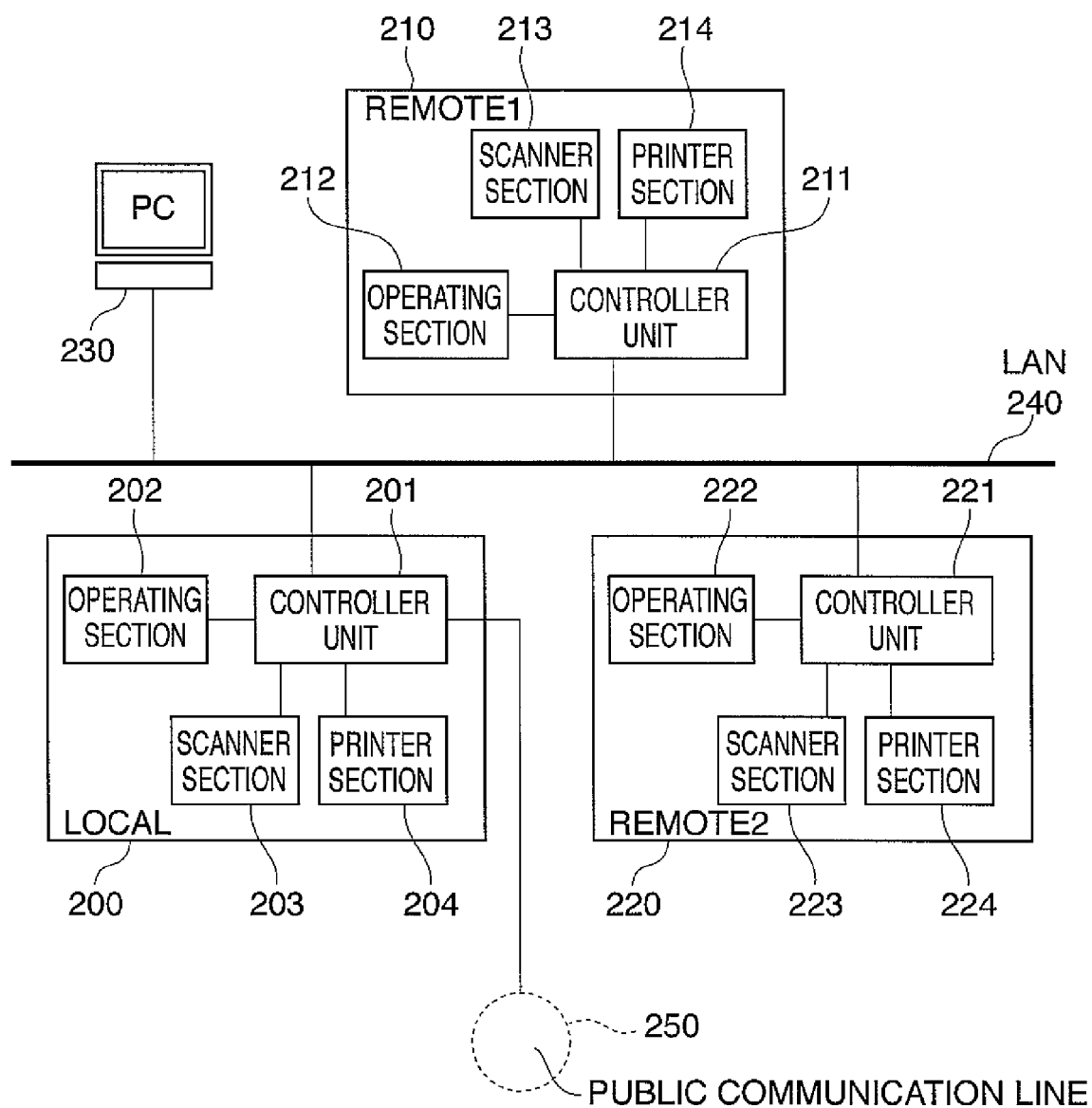
FIG. 1 is a block diagram of an entire image processing system according to an embodiment of the present invention.

FIG. 1 is a block diagram of an entire image processing system according to an embodiment of the present invention.

Referring to FIG. 1, the image processing system is connected to a plurality of image processing apparatuses 200, 210, and 220, and a personal computer (hereinafter simply referred to as "the PC") 230 via a LAN 240. The image processing apparatus 200 is comprised of a controller unit 201, an operating section 202, a scanner section 203, and a printer section 204. The image processing apparatus 210 is comprised of a controller unit 211, an operating section 212, a scanner section 213, and a printer section 214. The image processing apparatus 220 is comprised of a controller unit 221, an operating section 222, a scanner section 223, and a printer section 224.

The image processing apparatus 200 has a copying function, a transmission function, a box function, and a printing function. The operating section 202 is a user interface via which a user configures operations of the image processing apparatus 200. The scanner section 203 is an image reading device for reading image data from an original set at an original reading position. Although in the present embodiment, the printer section 204 is an image forming device for forming an image on a sheet by an electrophotographic (laser beam) method, the printer section 204 may form an image on a sheet by any of other appropriate methods, such as an ink-jet method and a thermal transfer method. The controller unit 201 is connected to the above-described sections, the LAN 240, and a public communication line 250, and controls the sections. The public communication line 250 is capable of G3/G4 facsimile transmission/reception, including transmission of color images.

The image processing apparatuses 210 and 220 are also configured as remotely-connected multifunctional peripherals (MFPs) having the copying function, the transmission function, the box function, and the printing function. Since they have the same configuration as that of the image processing apparatus 200, detailed descriptions thereof are omitted.

The PC 230 is an information processing apparatus having a general configuration, i.e. including a CPU, a ROM, a RAM, a display, and so forth, and is capable of communicating with the image processing apparatuses 200 to 220 to give instructions for image processing operations thereto. In the present embodiment, the PC 230 is configured to be capable of transmitting and receiving files and E-mails using the FTP (File Transfer Protocol) and the SMB (Server Message Block) Protocol.

Although descriptions will be given of control operations of the image processing apparatus 200, by way of example, with reference to FIG. 2 et seq., the image processing apparatus 200 may be replaced by the image processing apparatus 210 or 220. It should be noted that the image processing system may be formed by an arbitrary number of image processing apparatuses and an arbitrary number of PCs.

Figure 2:
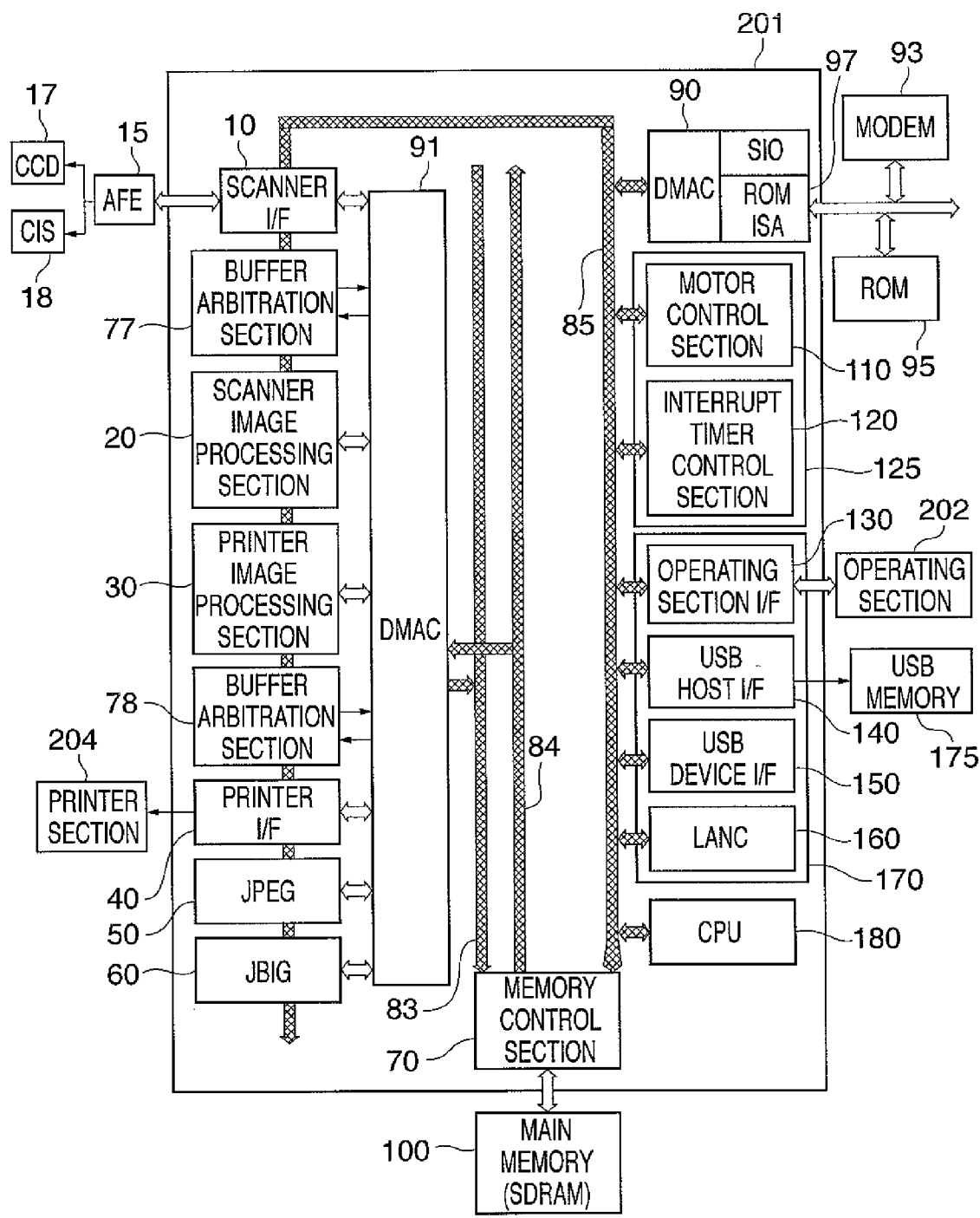
FIG. 2 is a block diagram of essential parts of an image processing apparatus.

FIG. 2 is a block diagram of essential parts of the image processing apparatus 200.

Referring to FIG. 2, the controller unit 201 of the image processing apparatus 200 is comprised of hardware modules, such as a scanner interface (hereinafter referred to as "I/F") 10, a printer I/F 40, a communication and user I/F control section 170, and a CPU 180.

The CPU 180 performs overall control of the operation of the image processing apparatus 200, including the display control of various screens, described hereinafter. Further, the CPU 180 executes processes, of which descriptions will be given with reference to illustrated flowcharts, based on programs stored in the ROM 95. The scanner I/F 10 processes input of image data delivered from image-reading devices (a CCD 17 and a CIS 18) of the scanner section 203 via an analog front end (AFE) 15. The input image data is transferred by DMA (direct memory access) by a memory control section 70 to be loaded in a main memory (SDRAM) 100. The AFE 15 enables reception of image data of originals without provision of respective separate dedicated circuits disposed therebetween.

A scanner image processing section 20 carries out image processing on the image data loaded in the main memory 100 by the processing of the scanner I/F 10, according to an image processing operation mode (color copying, monochrome copying, color scanning, monochrome scanning, etc.).

A buffer arbitration section 77 arbitrates between requests for writing and reading when transfer of data is performed between the scanner I/F 10 and the scanner image processing section 20 via an ring buffer area on the main memory 100. A printer image processing section 30 edits an area of an input image, converts resolution of the input image, and outputs the resulting image data to the printer section 204. The printer I/F 40 outputs the results of the image processing to the printer section 204.

A buffer arbitration section 78 arbitrates between requests for writing and reading when transfer of data is performed between the printer image processing section 30 and the printer I/F 40 via a ring buffer area on the main memory 100. Although the buffer arbitration sections 77 and 78 have the same basic construction, control methods thereof are different from each other depending on the use thereof.

A JPEG (Joint Photographic Experts Group) module 50 executes image data compression and expansion processes compliant with the JPEG standard. A JBIG (Joint Bi-level Image Experts Group) module 60 executes image data compression and expansion processes compliant with the JBIG standard. The memory control section 70 is connected to a first bus 83 and a second bus 84 related to image processing, and a third bus 85 related to computer processing, for controlling transfer of data for writing and reading the data into and from the main memory 100.

A DMAC 90 cooperates with the memory control section 70, and is connected to the ROM 95 via a ROMISA 97, to thereby generate and set predetermined address information for DMA control of transmission and reception of data between external devices and the communication and user I/F control section 170, and the main memory 100. A DMAC 91 cooperates with the memory control section 70 to thereby generate and set predetermined address information for DMA control of transmission and reception of data between the I/Fs 10 and 40 and the image processing sections 20 and 30, and the main memory 100.

The DMAC 91 performs the following processing: For example, the DMAC 91 generates address information for DMA transfer of image data, reading of which is processed by the scanner I/F 10, to the main memory 100 on a DMA channel-by-DMA channel basis, or generates address information for use in reading image data loaded in the main memory 100, according to each DMA channel. Further, the DMAC 91 performs processing, such as DMA transfer of address information to the scanner image processing section 20. In short, the DMAC 91 functions as a unit for providing DMA control between the I/Fs 10 and 40 and the image processing sections 20 and 30, and the main memory 100, in cooperation with the memory control section 70.

The ROM 95 stores control parameters and control program data associated with the respective image reading devices (the CCD 17 and the CIS 18). This makes it possible to set various control parameters in a manner associated with each of the image reading devices, thereby enabling inputting of image data according to each of respective different data output formats of the CCD 17 and the CIS 18. Therefore, provision of dedicated I/F circuits can be dispensed with.

The main memory 100 stores not only image data read from originals but also address book information (hereinafter referred to as "the address book") 5000 (FIG. 9), and removable memory information 5100 (FIG. 10). The address book 5000 and the removable memory information 5100 will be described in detail hereinafter.

The first bus 83 is capable of sending data read out from the main memory 100 to the respective processing sections (10 to 60) related to image processing. The second bus 84 is capable of sending data read out from the respective processing sections (10 to 60) related to image processing to the main memory 100. The first bus 83 and the second bus 84 perform transmission and reception of image data between each processing section related to image processing and the main memory 100 in a pair. The third bus 85 is a bus related to computer processing, to which are connected the CPU 180, the communication and user I/F control section 170, a mechatronic control system 125, control registers within the image processing sections, and the DMAC 90.

The mechatronic control system 125 includes a motor control section 110 and an interrupt timer control section 120. The motor control section 110 drivingly controls a motor, not shown, disposed in the image processing apparatus 200. The interrupt timer control section 120 performs timing control for driving the motor and for synchronization of processes executed by sections related to image processing.

The communication and user I/F control section 170 includes an operating section I/F 130, a USB host I/F 140, a USB device I/F 150, and a LAN controller (LANC) 160. The operating section I/F 130 is in charge of interfacing with the operating section 202 to output screen data of displayed objects to the operating section 202. Further, the operating section I/F 130 plays the role of transmitting information input by the user from the operating section 202 to the CPU 180.

The USB host I/F 140 and the USB device I/F 150 each detect connection of a peripheral device and mounting of a removable memory, and enables communication between the image processing apparatus 200 and the connected peripheral device and the mounted removable memory. FIG. 2 shows a state of the controller unit 201 in which a USB memory (hereinafter referred to as "the removable memory") 175, which is an example of a removable storage medium, is connected to the USB host I/F 140. The number of USB I/Fs to be provided is arbitrary. The LANC 160 controls transmission and reception of data to and from apparatuses and devices connected via the LAN.

It should be noted that in the present embodiment, the image processing apparatus 200 is assumed to be equipped with e.g. three drives (connectors), not shown, into each of which a removable memory is inserted, and which are referred to as "the E drive", "the F drive", and "the G drive", respectively.

Figure 3:
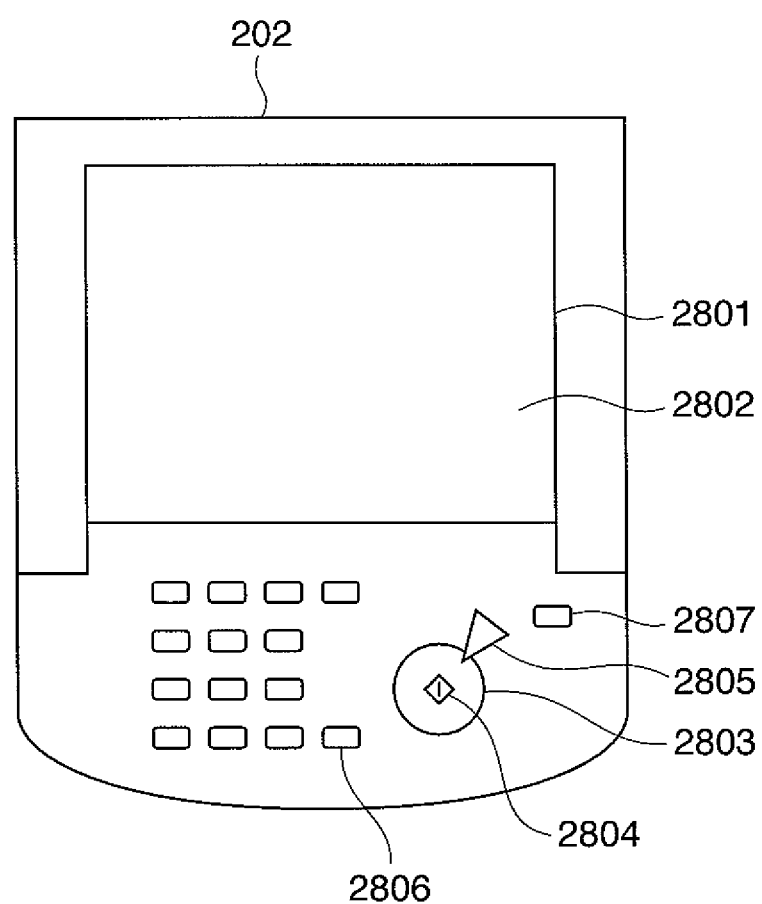
FIG. 3 is a view of an operating section of the image processing apparatus.

FIG. 3 is a view of the operating section 202 of the image processing apparatus 200.

As shown in FIG. 3, the operating section 202 includes an LCD (Liquid Crystal Display) unit 2801, a start key 2803, a stop key 2805, and so forth. The LCD display unit 2801, which is formed by affixing a touch panel sheet 2802 to an LCD, displays various screens, described hereinafter, and soft keys, and when a soft key being displayed is depressed, transmits information on the position of the key to the CPU 180.

The start key 2803 is used by the user e.g. so as to instruct the start of an original image reading operation. The start key 2803 has a two-color LED 2804 of green and red disposed on a central portion thereof, and the LED 2804 indicates whether or not the start key 2803 is in an operable state by its color. The stop key 2805 is operated by the user so as to stop an operation of the image processing apparatus in progress. An ID key 2806 is operated by the user so as to input a user ID. A reset key 2807 is operated to initialize settings provided via the operating section 202.

Figure 4:
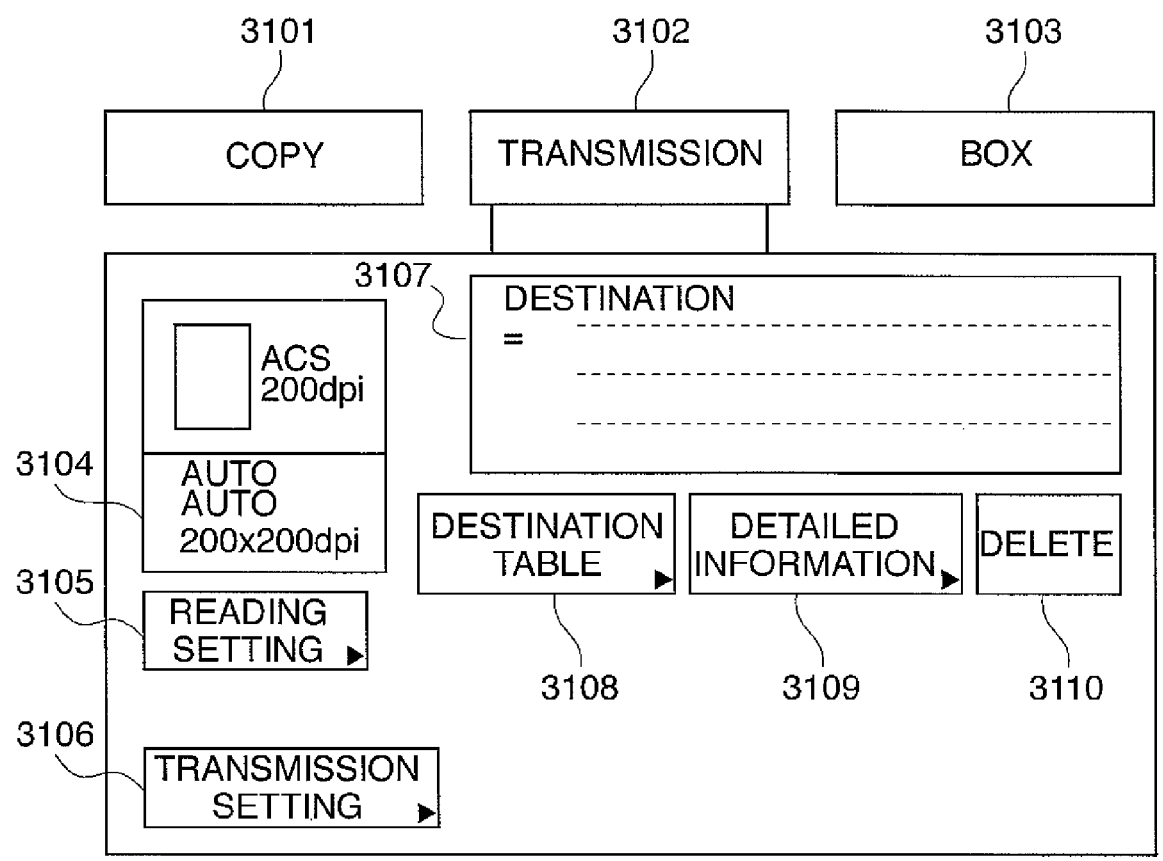
FIG. 4 is a view of an initial screen of the image processing apparatus.

FIG. 4 is a view of an initial screen of the image processing apparatus 200.

As shown in FIG. 4, the initial screen is displayed on the LCD display unit 2801 of the operating section 202 of the image processing apparatus 200. The initial screen is also a standard screen displayed after the power of the image processing apparatus 200 is turned on, and after initialization (i.e. after setting each image processing function). It should be noted that FIG. 4 shows a screen for the transmission function, and in the present embodiment, the screen for the transmission function is assumed to be the standard screen. Of course, the standard screen is not limited to the screen for the transmission function, but a screen for another function may be set to the standard screen.

Depression of a copy tab 3101 switches the screen to a screen for configuring various settings of the copying function. Depression of a transmission tab 3102 switches the screen to a screen for configuring various settings of the transmission function for transmitting scanned images by facsimile or E-mail. It should be noted that in the present embodiment, a removable memory can be specified as one of transmission destinations to be set for the transmission function.

Depression of a box tab 3103 switches the screen to a screen for configuration the box function. The box function includes functions of storing scanned images and PDL images in the main memory 100 and the removable memory, and printing or transmitting the scanned and PDL images stored in the main memory 100 and the removable memory. A display 3104 displays settings for reading images, set by a button 3105. A screen switching operation performed in response to depression of each of the above-described tabs is controlled by the CPU 180.

The button 3105 is provided for setting the resolution and density of an image to be read. A button 3106 is provided for setting a timer for timer transmission, and configuring settings of printing by the printer section. A destination box 3107 is provided for displaying a specified transmission destination. A button (destination table button) 3108 is provided for displaying transmission destinations on the destination box 3107. A button 3109 is provided for displaying detailed information on a selected one of the transmission destinations displayed in the destination box 3107. A button 3110 is provided for deleting a selected one of the transmission destinations displayed in the destination box 3107.

Figure 5:
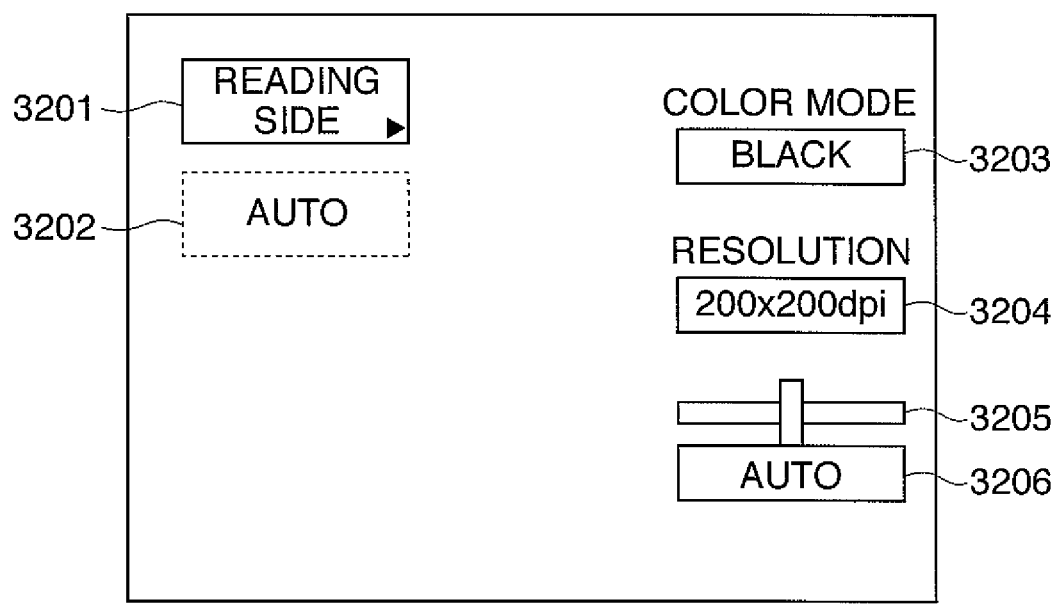
FIG. 5 is a view of a popup screen of the image processing apparatus.

FIG. 5 is a view of a popup screen of the image processing apparatus 200.

Referring to FIG. 5, the popup screen is displayed on the LCD display unit 2801 of the operating section 202 when the button 3105 on the initial screen is depressed. A button 3201 is depressed so as to select and set a reading size of an original from the popup screen. A display 3202 displays the set read size. A button 3203 is provided for selecting a reading mode of the original. More specifically, depression of the button 3203 enables selection from three kinds of reading modes, i.e. a color mode, a black mode, and an ACS (Auto Color Selection) mode. The color mode can also be selected for the copying function and the box function, similarly in the respective screens. In the color mode, a color image is stored and in the black mode, a monochrome image is stored. Further, in the ACS mode, the color image and the results of determination of whether the original is colored or monochrome are stored.

A resolution input section 3204 is provided for inputting a reading resolution by selecting from a popup screen, so as to specify the resolution. A slider 3205 is provided for adjusting the reading density of the original, and in the present embodiment, the reading density can be adjusted in nine steps. A button 3206 is depressed to automatically determine a reading density, when reading an image of which the base is fogged, as in a newspaper. The button 3206 can be operated for the same configuration not only for scanning but also for copying the original.

Figure 6:
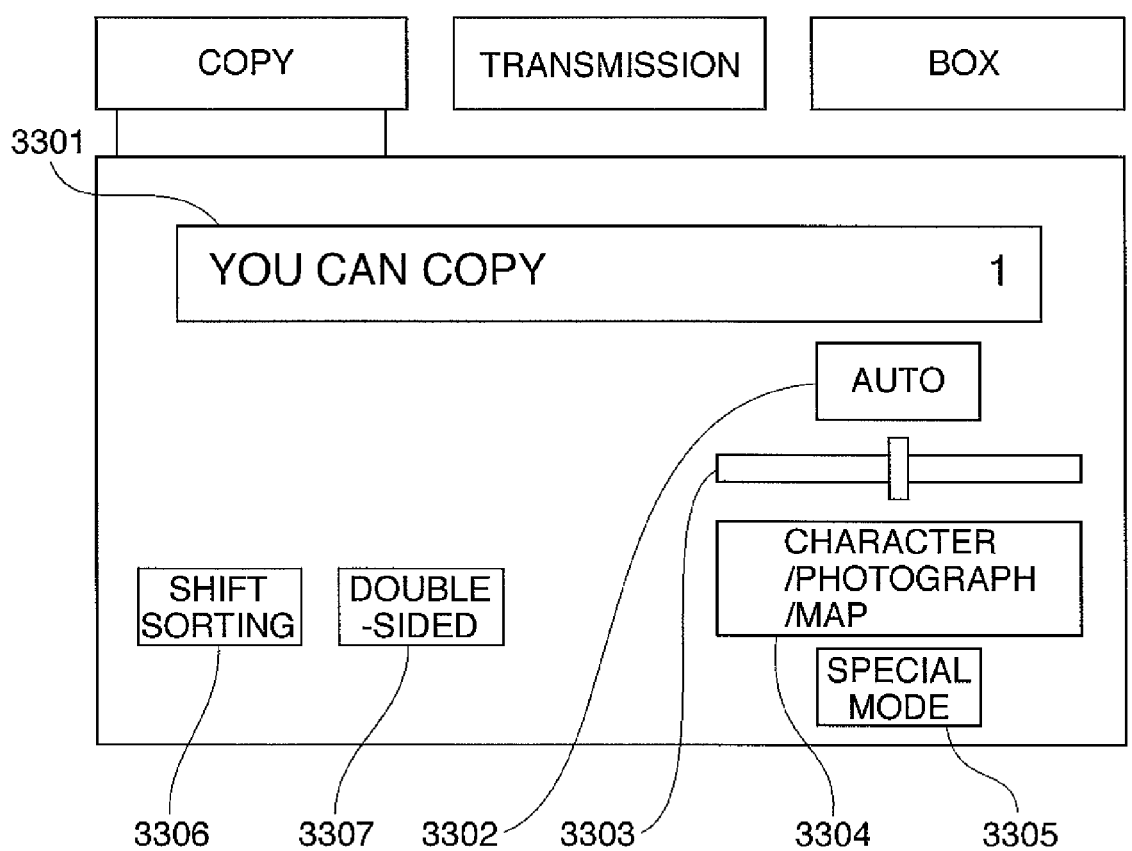
FIG. 6 is a view of a copy screen of the image processing apparatus.

FIG. 6 is a view of a copy screen of the image processing apparatus 200.

As shown in FIG. 6, the copy screen is displayed on the LCD display unit 2801 of the operating section 202 when the copy tab 3101 on the initial screen is depressed. A display 3301 shows whether or not the image processing apparatus 200 is in a state capable of performing a copying operation, and at the same time shows a set number of copies. A button 3302 has the same function as that of the button 3206, and is depressed so as to select whether or not to automatically eliminate the base image. A slider 3303 has the same function as that of the slider 3205, and is capable of density adjustment in nine steps A selection section 3304 is provided for selecting a type of an original, and is configured to be capable of selection e.g. from four types of originals (a character/photograph/map original, a character original, a printing paper photograph original, and a printed photograph original). An special mode button 3305 is configured to be capable of setting a reduced layout (function for performing reduced printing of a plurality of originals on a sheet) and a color balance (fine adjustment of the respective colors of C, M, Y, and K). A button 3306 is provided for setting various kinds of finishing (post-processing) of a sheet having an image formed thereon, and is configured to be capable of setting shift sorting, staple sorting, and group sorting. A button 3307 is configured to be capable of setting double-sided reading and double-sided printing.

Figure 7:
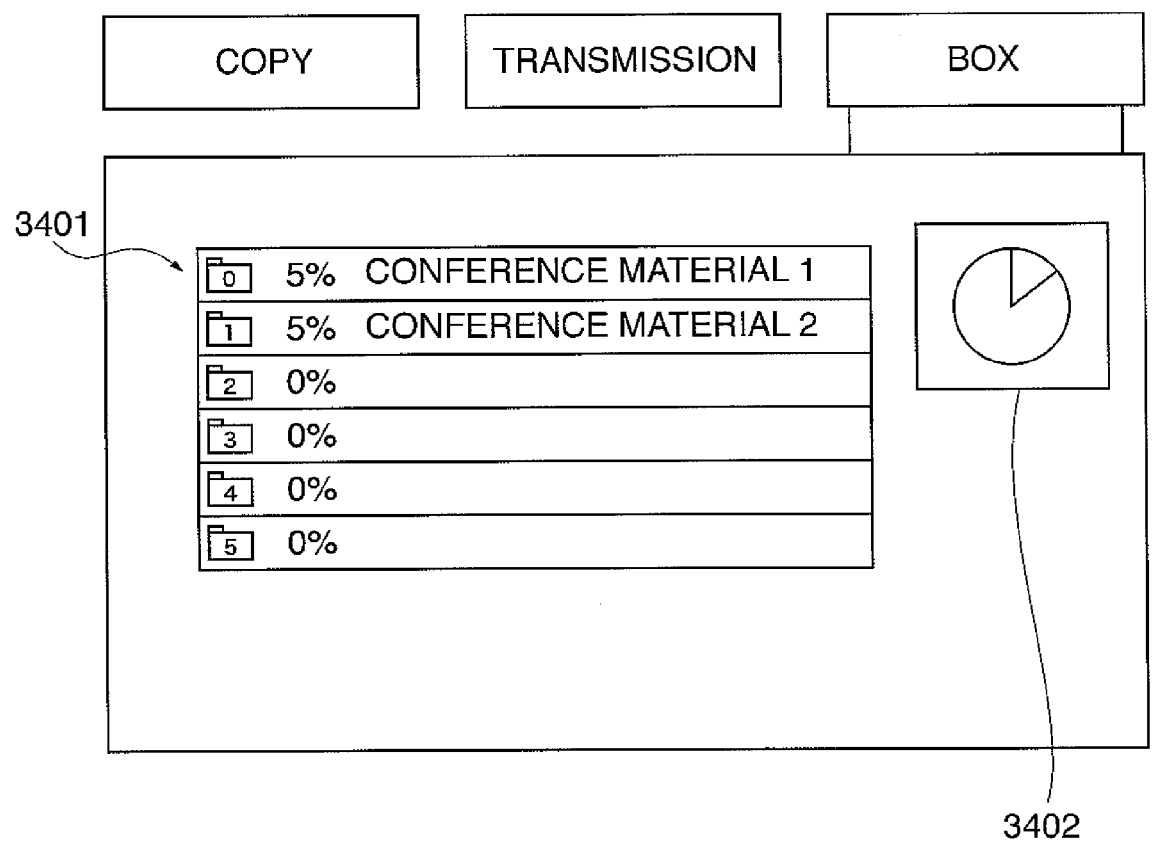
FIG. 7 is a view of a box screen of the image processing apparatus.

FIG. 7 is a view of a box screen of the image processing apparatus 200.

As shown in FIG. 7, the box screen is displayed on the LCD display unit 2801 of the operating section 202 when the box tab 3103 on the initial screen is depressed. Each folder 3401 is a logical container formed by logically dividing the main memory 100. A folder number is assigned to each folder 3401 in advance, and the uppermost folder has a folder number of 0. A ratio (%) of the disk capacity used by each folder is displayed laterally of the folder number. Further, an arbitrary name can be given to each folder, and the name as well is displayed laterally of the folder number. A display 3402 displays the total amount of use of the main memory 100.

Next, a description will be given of control of a ScanTo removable memory function of the image processing apparatus 200. The ScanTo removable memory function is provided for storing image data read by the scanner section 203 of the image processing apparatus 200, in the removable memory, using the transmission function of the image processing apparatus 200.

Figure 8:
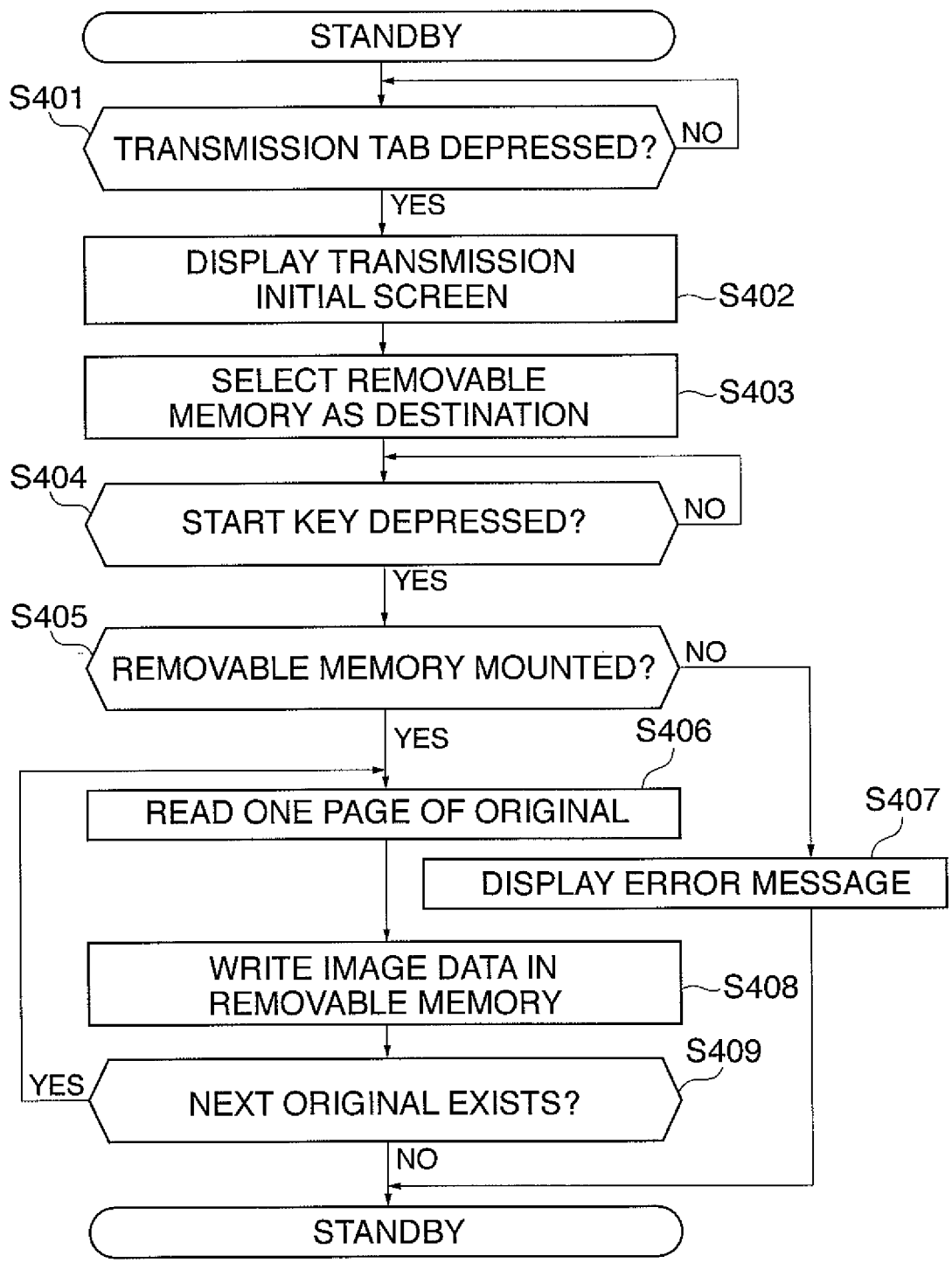
FIG. 8 is a flowchart of a process for storing image data in a removable memory mounted on the image processing apparatus.

FIG. 8 is a flowchart of a process for storing image data in the removable memory mounted on the image processing apparatus 200.

Referring to FIG. 8, the CPU 180 of the image processing apparatus 200 determines whether or not the transmission tab 3102 on the initial screen displayed on the operating section 202 is depressed by the user (step S401). If the transmission tab 3102 is depressed by the user, the process proceeds to a step S402, whereas if the transmission tab 3102 is not depressed by the user, the process returns to the step S401.

If the transmission tab 3102 is depressed, the CPU 180 forms transmission initial screen data for providing a user interface for enabling the user to input a destination to which image data obtained by scanning an original is to be sent, and displays a transmission initial screen on the operating section 202 (step S402). A selected destination display screen displayed in the step S402 corresponds to the FIG. 4 initial screen. Then, the CPU 180 stores a removable memory selected by the user as the destination of the image data obtained by scanning the original (step S403), whereafter the process proceeds to a step S404.

The CPU 180 determines whether or not the user has set the original on the original reading position of the image processing apparatus 200, and has depressed the start key 2803 (step S404). If the start key 2803 has been depressed, the process proceeds to a step S405. If the start key 2803 has not been depressed, the process returns to the step S404.

If the start key 2803 has been depressed, the CPU 180 confirms using the USB host I/F 140 whether or not the removable memory stored as the above-described destination is mounted on the image processing apparatus 200 (step S405). If the removable memory is mounted on the image processing apparatus 200, the process proceeds to a step S406, whereas if the removable memory is not mounted on the image processing apparatus 200, the process proceeds to a step S407.

If the removable memory is mounted, the CPU 180 reads one page of the original using the scanner section 203 (step S406), and stores image data read from the original in the main memory 100, followed by the process proceeding to a step S408. If the removable memory is not mounted, the CPU 180 displays an error message to the effect that the specified removable memory is not mounted, on the operating section 202 (step S407), followed by terminating the present process.

The CPU 180 writes the image data stored in the main memory 100 in the removable memory (step S408), and deletes this image data stored in the main memory 100. Then, the CPU 180 determines whether or not there is a next original to be scanned (step S409). If there is a next original to be scanned, the process proceeds to the step S406, whereas if there is no next original to be scanned, the present process is terminated.

It should be noted that the processing in the steps S406, S408, and S409 may be performed as follows: First, a plurality of pages of originals are read. Then, image data of the plurality of pages of the originals is written in the main memory 100. After completion of reading of the plurality of pages of the originals, the image data is written in the removable memory.

Next, a detailed description will be given of a process for setting the removable memory as the transmission destination, which is executed in the step S403 in FIG. 8.

FIG. 9 is a view of the address book 5000 held by the image processing apparatus 200.

Referring to FIG. 9, the address book 5000 is stored in the main memory 100. An address book number 5001 within a range of integers of 1 to 100 is assigned to each address in the order of registration thereof, and an address book number 5001 within a range of integers of 101 and more is used for automatic registration of a removable memory. When a removable memory is mounted on the image processing apparatus 200, the removable memory is automatically registered as one having an address book number 5001 of 101 or larger, by an address book automatic registration process (FIG. 11), described hereinafter, for automatically registering the removable memory. When a removable memory is removed from the image processing apparatus 200, the registration thereof is automatically deleted from the address book 5000. For each address book number of 1 to 100, each of items thereof can be manually entered by the user or the administrator.

An Abbreviation 5002 indicates an abbreviated name of a transmission destination, and can be set when the removable memory is registered by the user. When a removable memory is mounted on the image processing apparatus 200, information indicative of a manufacturer of the removable memory is obtained from the removable memory, and an abbreviated name formed based on the information is displayed one standing for the removable memory registered with an address book number of 101 or larger.

A transmission mode 5003 indicates a mode of transmission of image data, and includes Fax transmission, Internet Fax (hereinafter referred to as "IFAX") transmission, E-mail transmission, file transfer by FTP, file transfer by SMB, and transmission (storage) to a removable memory.

An address 5004 indicates a destination to which image data is transmitted in the transmission mode 5003. The address 5004 is represented by a Fax number in the Fax transmission, by an IP address in the IFAX, by an E-mail address in the E-mail transmission, and by a folder path in the file transfer by FTP. In the case of transmission to a removable memory, a combination of a hardware ID, which is an ID unique to a removable memory, and "¥¥ specified folder path" are stored.

A preferential display flag 5005 indicates whether or not the destination or address is to be preferentially displayed on the selected destination display screen and a transmission destination table screen, both described hereinafter. When the preferential display flag 5005 is equal to 1, it indicates that the address is to be preferentially displayed, whereas when the preferential display flag 5005 is equal to 0, it indicates that the address is not to be preferentially displayed. A destination selection flag 5006 indicates whether or not the address is selected as a destination, and the selection is made by the user from a transmission destination table, described hereinafter. When the destination selection flag 5006 is equal to 1, it indicates that the address is selected as a destination, whereas when the destination selection flag 5006 is equal to 0, it indicates that the address is not selected as a destination. It should be noted that the destination selection flag 5006 is set to 0 when the selected destination display screen or the transmission destination table screen is switched to another screen.

A detailed information pointer 5007, which indicates a link to detailed information, is a pointer to an area storing detailed information on the destination. When there is no detailed information, the detailed information pointer 5007 is set to NULL. When the transmission mode is the transmission to a removable memory, and at the same time there is detailed information, the detailed information pointer 5007 points information on one of removable memories in the removable memory information 5100.

FIG. 10 is a view of a format of the removable memory information updated when a removable memory is mounted on or removed from the image processing apparatus 200.

Referring to FIG. 10, the removable memory information 5100 is stored in the main memory 100. The removable memory information 5100 includes a drive name 5101, a hardware ID 5102, manufacturer information 5103, and a write execution count 5104. Further, the removable memory information 5100 includes a read/print execution count 5105, a remaining memory capacity 5106, status information 5107, and address book number information 5108.

The drive name 5101 is assigned in advance to a drive (connector) on which a removable memory is removably mounted. The hardware ID 5102 is information uniquely assigned to an individual removable memory. The manufacturer information 5103 indicates the manufacturer of a removable memory, which is obtained by the CPU 180 through communication with the removable memory via the USB host I/F 140. The write execution count 5104 represents the number of times of writing of data in a removable memory after the removable memory is mounted on the image processing apparatus 200.

The read/print execution count 5105 indicates the number of times of reading image data from a removable memory and printing the same after the removable memory is mounted on the image processing apparatus 200, or the number of times of reading image data from the removable memory after it is mounted on the image processing apparatus 200. The remaining memory capacity 5106 indicates the remaining capacity of a removable memory. The status information 5107 indicates a (normal/abnormal) status of a removable memory mounted on each of drives (E, F, and G). The address book number information 5108 indicates an address book number in the address book, which is assigned to a removable memory.

Figure 11:
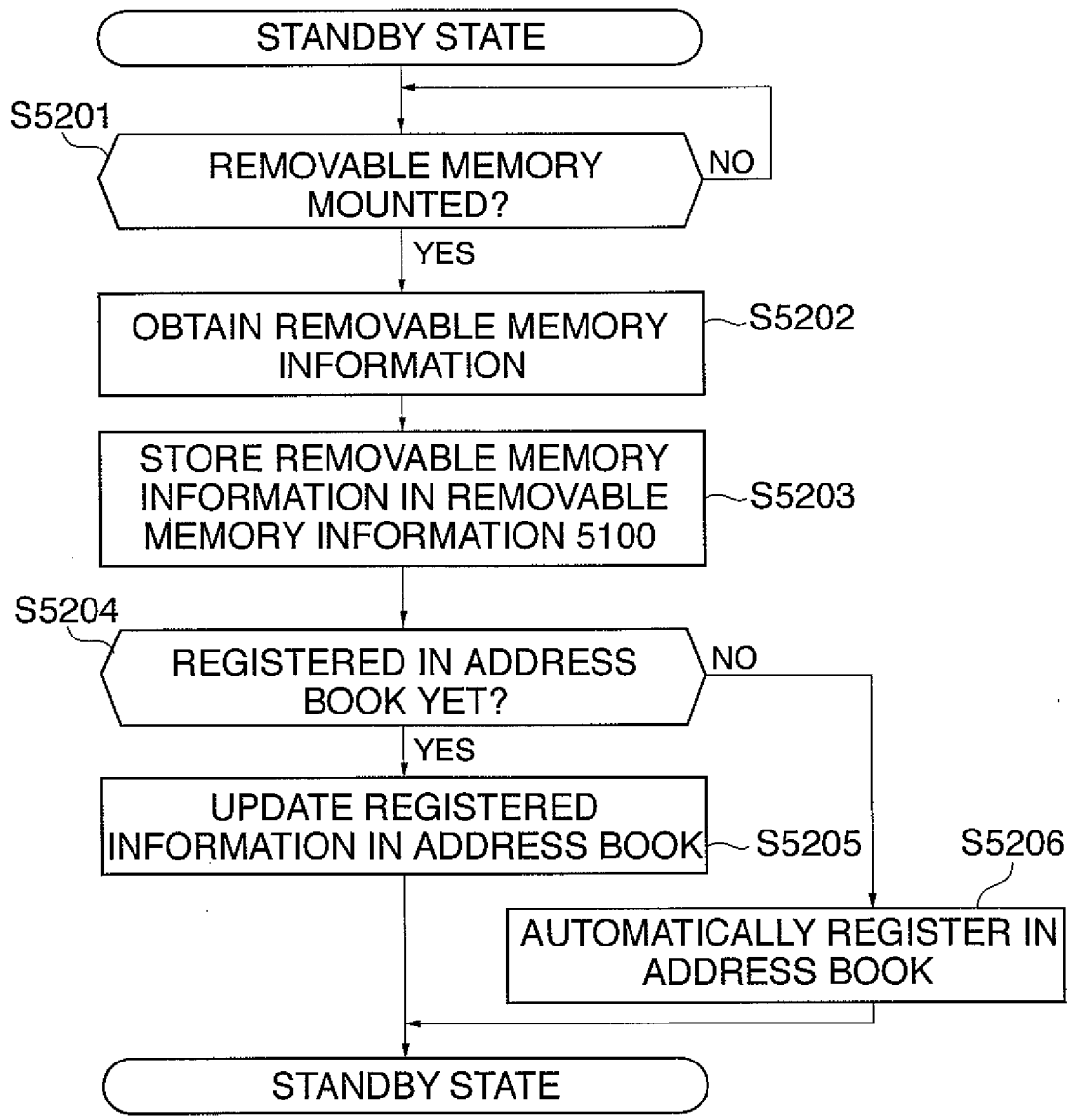
FIG. 11 is a flowchart of a control process executed when information on the removable memory mounted on the image processing apparatus is automatically registered in the address book.

FIG. 11 is a flowchart of a control process executed for automatically registering information on a removable memory mounted on the image processing apparatus 200, in the address book.

As shown in FIG. 11, the CPU 180 of the image processing apparatus 200 determines via the USB host I/F 140 whether or not a removable memory has been newly mounted on the image processing apparatus 200 (step S5201). If a removable memory has been newly mounted on the image processing apparatus 200, the process proceeds to a step S5201, whereas if no removable memory has been newly mounted on the image processing apparatus 200, the process returns to the step S5201.

If a removable memory has been mounted on the image processing apparatus 200, the CPU 180 communicates with the removable memory via the USB host I/F 140 to thereby obtain information from the removable memory (step S5202). Then, the CPU 180 stores the obtained information in the removable memory information 5100 of the main memory 100 (FIG. 10) (step S5203).

Next, the CPU 180 refers to hardware IDs in the column of the address 5004 in the address book 5000 (FIG. 9), to determine whether or not they include the same hardware ID as that of the mounted removable memory (step S5204). If they include the same hardware ID as that of the mounted removable memory, the process proceeds to a step S5205. On the other hand, if they do not include the same hardware ID as that of the mounted removable memory, the process proceeds to a step S5206.

If the same hardware ID as that of the mounted removable memory exists, the CPU 180 obtains information on the mounted removable memory from the removable memory information 5100. Further, the CPU 180 causes the information on the mounted removable memory to be reflected on the address book 5000, sets the preferential display flag 5005 associated therewith to 1, and stores a storage place of the removable memory information 5100 in the detailed information pointer 5007. Furthermore, the CPU 180 stores the above-described automatically registered address book number of the mounted removable memory in the address book number information 5108 of the removable memory information 5100 (step S5205), followed by terminating the present process.

If the same hardware ID as that of the mounted removable memory does not exist, the CPU 180 searches the address book 5000 for an available address book number which is not smaller than 101. Further, the CPU 180 obtains information on the mounted removable memory from the removable memory information 5100, and registers the same with the address book 5000 under the address book number. Further, the CPU 180 sets the associated preferential display flag 5005 in the address book 5000 to 1, and stores a storage place of the removable memory information 5100 in the associated detailed information pointer 5007. Furthermore, the CPU 180 stores the above-described automatically registered address book number of the mounted removable memory in the address book number information 5108 of the removable memory information 5100 (step S5206), followed by terminating the present process.

Execution of the process of the FIG. 11 flowchart makes it is possible to automatically register a removable memory in the address book held by the image processing apparatus 200, simply by mounting the removable memory on the image processing apparatus 200.

Figure 12:
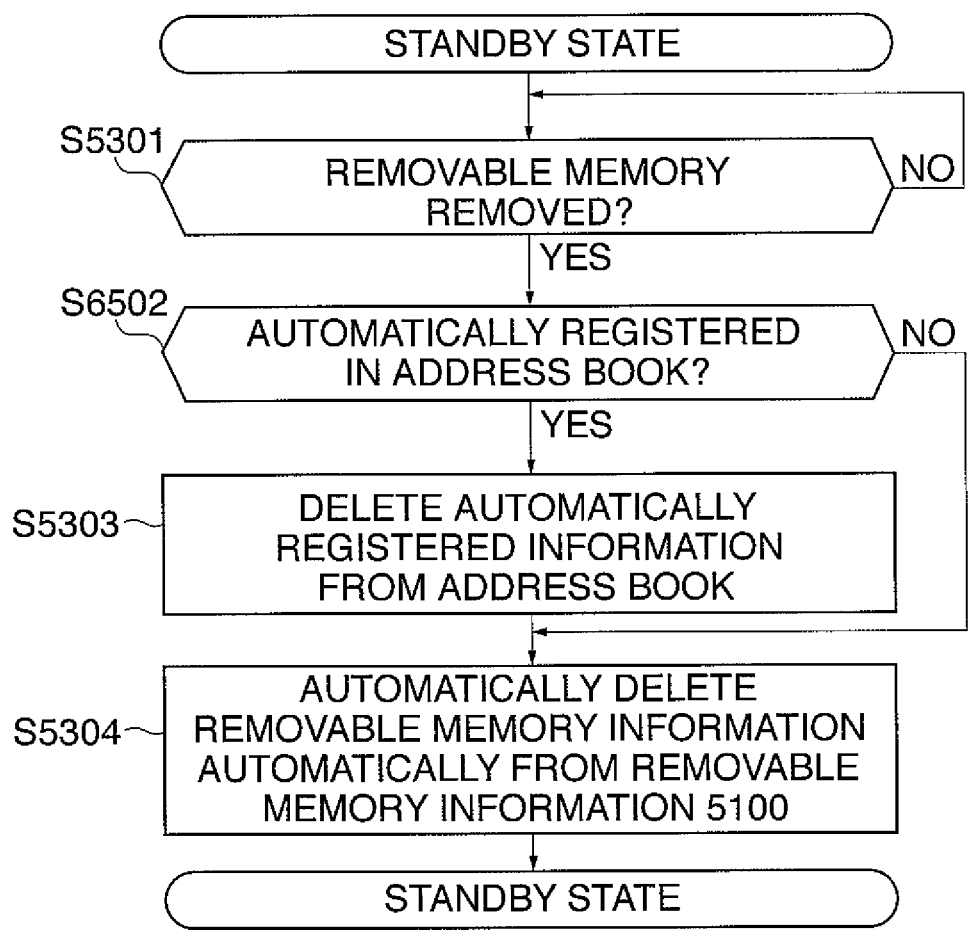
FIG. 12 is a flowchart of a control process executed when the automatically registered removable memory is deleted from the address book of the image processing apparatus.

FIG. 12 is a flowchart of a control process executed for deleting the automatically registered removable memory from the address book 5000 of the image processing apparatus 200.

As shown in FIG. 11, the CPU 180 of the image processing apparatus 200 determines whether or not the removable memory has been removed from the image processing apparatus 200 (step S5301). If the removable memory has been removed, the process proceeds to a step S5302, whereas if not, the process returns to the step S5301.

If the removable memory has been removed, the CPU 180 performs the following process: The CPU 180 refers to the hardware IDs in the column of the address 5004 in the address book 5000, and determines whether or not the removed removable memory is registered under an address book number 5001 in a range of 101 or larger (step S5302). If the removed removable memory is registered, the process proceeds to a step S5303, whereas if not, the process proceeds to a step S5304.

If the removed removable memory is registered, the CPU 180 performs the following process: The CPU 180 deletes the information registered under the address book number associated with the removed removable memory, from the address book 5000 (step S5303), followed by the process proceeding to a step S5304. In the step S5304, the CPU 180 deletes the information on the removed removable memory from the removable memory information 5100, followed by terminating the present process.

Execution of the process of the FIG. 12 flowchart makes it is possible to automatically delete information on a removable memory from the address book, simply by removing the removable memory from the image processing apparatus 200. As a consequence, in setting a removable memory to a transmission destination, it is possible to prevent erroneous selection of a removable memory which is not mounted.

Figure 13:
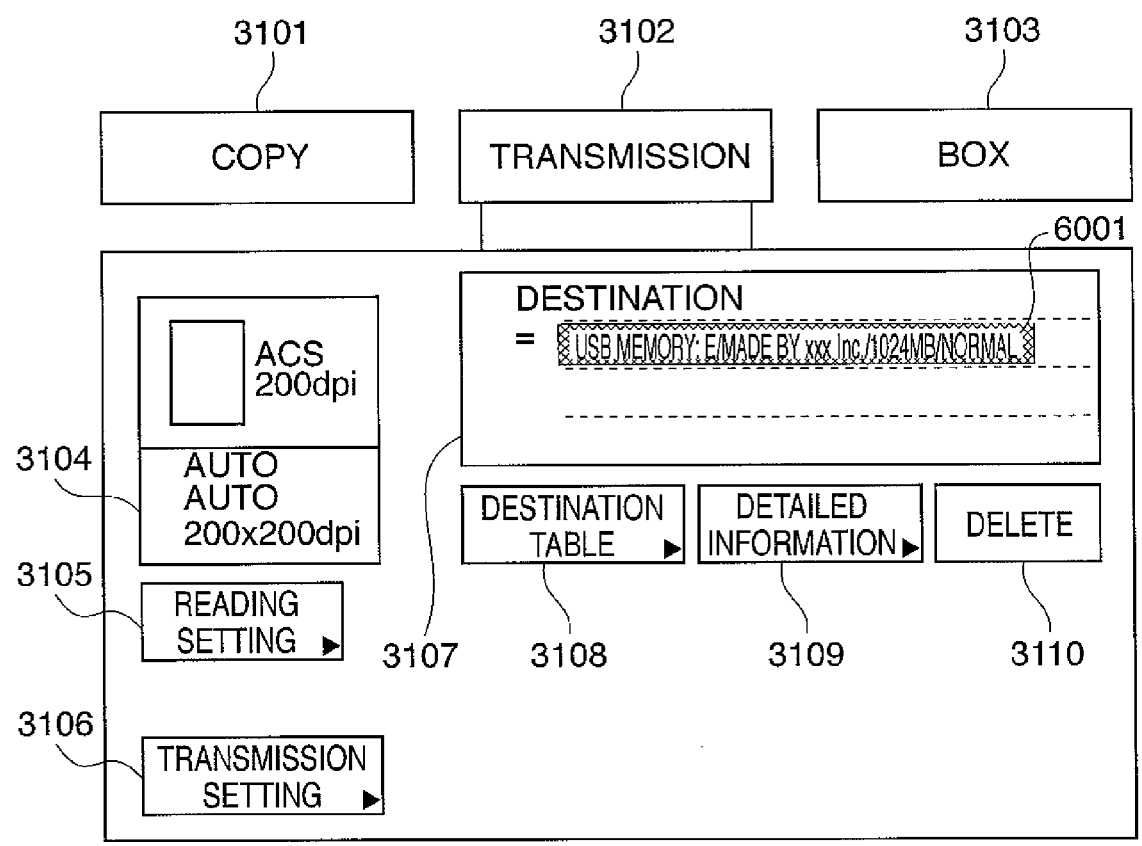
FIG. 13 is a view of a selected destination display screen of the image processing apparatus.

FIG. 13 is a view of the selected destination display screen of the image processing apparatus 200.

Referring to FIG. 13, the selected destination display screen is displayed on the LCD display unit 2801 of the operating section 202. A destination box 6001 is blank when no destination is set. When predetermined conditions (that a removable memory is mounted on the image processing apparatus 200, that the write execution count is equal to 0, and that the read/print execution count is equal to 0, referred to hereinafter, are satisfied, the mounted removable memory is automatically set to a destination under the control of the CPU 180, and is displayed in the destination box 6001.

Next, a description will be given of a method for specifying a destination when normal transmission is performed in which image data is transmitted to a destination other than removable memories. When the user depresses the destination table button 3108 in a state in which the destination box 6001 is blank, the transmission destination table screen (FIG. 17), which displays information for selection of a destination from the address book 5000, is displayed on the operating section 202. Screen data for displaying the FIG. 17 transmission destination table screen is generated based on the address book 5000 shown in FIG. 9. When the user designates a desired destination on the transmission destination table screen, the associated destination selection flag 5006 in the address book 5000 is set to 1. Then, when the user depresses a close button 7003, the specified destination is displayed in the destination box 6001 of the selected destination display screen.

Figure 14:
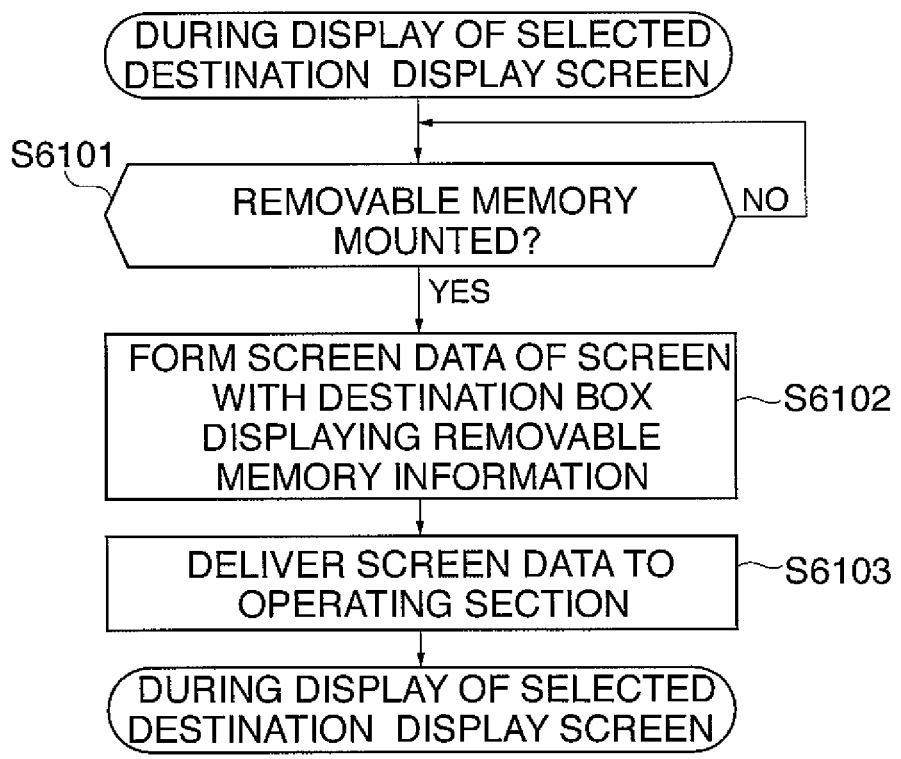
FIG. 14 is a flowchart of a display control process executed when a removable memory is mounted during display of the selected destination display screen of the image processing apparatus.

FIG. 14 is a flowchart of a display control process executed when a removable memory is mounted during display of the selected destination display screen of the image processing apparatus 200.

Referring to FIG. 14, the CPU 180 of the image processing apparatus 200 makes the following determination when the selected destination display screen (the FIG. 13 display screen with the destination box 6001 being blank or a destination other than a removable memory being displayed) is displayed on the operating section 202: The CPU 180 refers to the address book 5000, and determines whether or not the address book 5000 contains undisplayed registered information in which the transmission mode 5003 is transmission to a removable memory, and at the same time the preferential display flag 505 is equal to 1.

If there is undisplayed registered removable memory information, the CPU 180 determines that a removable memory has been newly mounted on the image processing apparatus 200 (YES to a step S6101), and the process proceeds to a step S6102. On the other hand, if there is no undisplayed registered removable memory information, the CPU 180 determines that no removable memory has been newly mounted on the image processing apparatus 200 (NO to the step S6101), and the process returns to the step S6101.

When a removable memory has been mounted on the image processing apparatus 200, the CPU 180, which has confirmed mounting of the removable memory on the image processing apparatus 200, sets the destination selection flag 5006 for the removable memory to 1. Further, the CPU 180 refers to the address book 5000 and the removable memory information 5100 linked to the address book 5000, thereby forming data of the selected destination display screen (selected destination display screen data) such that the data is displayed in the destination box. Furthermore, when the remaining memory capacity of the removable memory is smaller than a predetermined value, or when the status information is not indicative of the normal status of the removable memory, the CPU 180 forms data of the destination box on the selected destination display screen such that the display of the removable memory is grayed out in a manner distinct from normal display (step S6102).

Then, the CPU 180 delivers the selected destination display screen data to the operating section 202 via the operating section I/F 130 (step S6103). This causes the selected destination display screen (FIG. 13) to be displayed on the operating section 202, and then the present process is terminated.

It should be noted that if the removable memory is mounted when a destination other than the removable memory is being displayed on the FIG. 13 display screen, execution of the process of the FIG. 14 flowchart causes the following display: A screen is displayed on which the mounted removable memory is added as a destination to the destination displayed before the removable memory has been mounted.

As described above, when a transmission screen is displayed, mounting of a removable memory on the image processing apparatus 200 is detected. This enables the image processing apparatus 200 to judge that the user uses the removable memory as a destination of transfer of image data. Further, the removable memory is automatically registered as a destination, and is automatically displayed in the destination box of the selected destination display screen, which makes it possible to reduce the possibility of an error in the setting of a destination and the trouble of setting operations.

Figure 15:
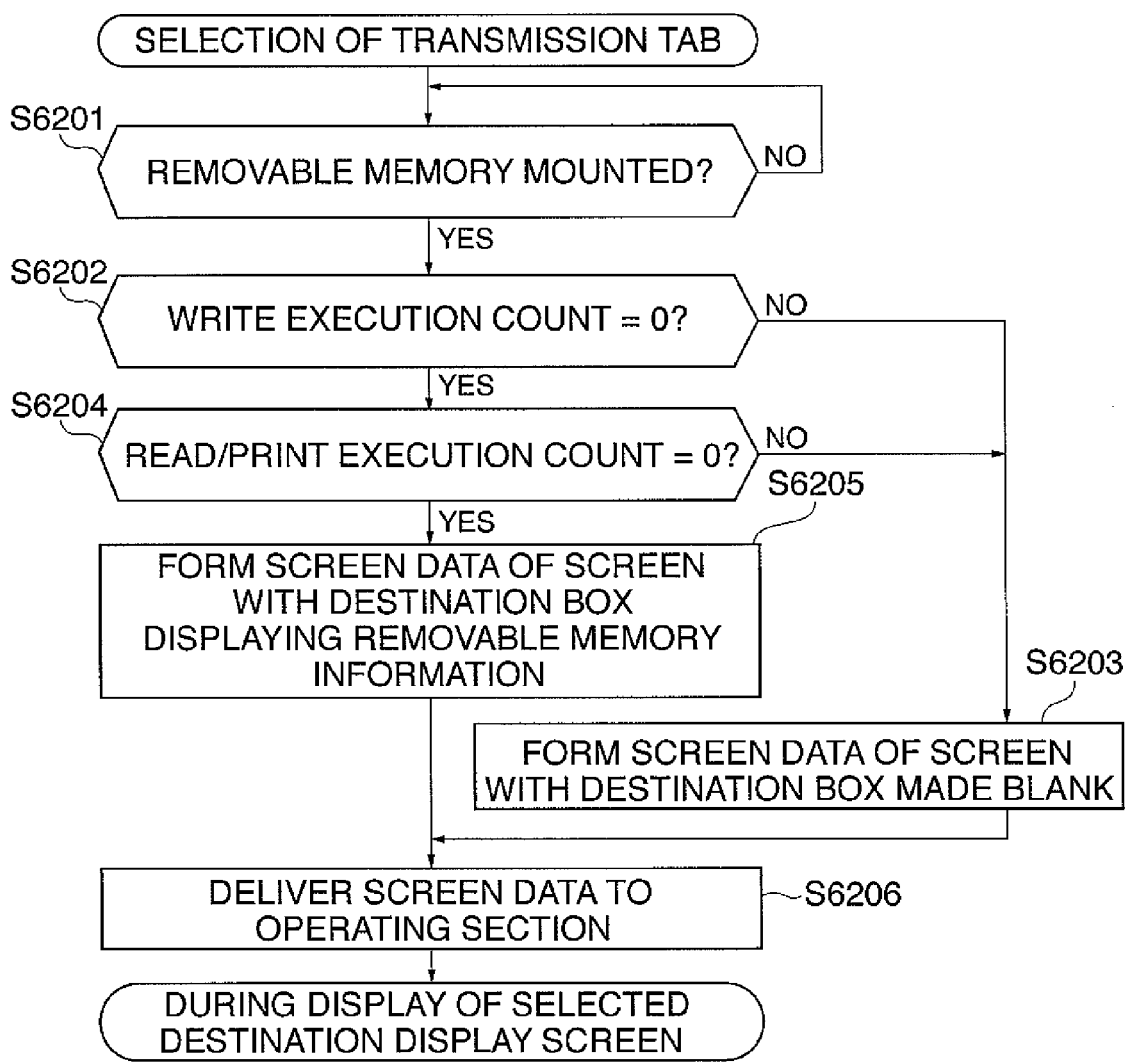
FIG. 15 is a flowchart of a control process executed when the selected destination display screen is displayed in a state in which a removable memory has already been mounted on the image processing apparatus.

FIG. 15 is a flowchart of a control process executed when the selected destination display screen is displayed in a state in which a removable memory has already been mounted on the image processing apparatus 200.

Referring to FIG. 15, when the user selects the transmission tab 3102, the CPU 180 of the image processing apparatus 200 performs the following determination in a step S6201: The CPU 180 refers to the address book 5000, to determine whether or not the address book 5000 contains undisplayed registered information in which the transmission mode 5003 is transmission to a removable memory, and at the same time the preferential display flag 5005 is equal to 1.

If there is undisplayed registered removable memory information, the CPU 180 determines that a removable memory has been newly mounted on the image processing apparatus 200 (YES to a step S6201), and the process proceeds to a step S6202. On the other hand, if there is no undisplayed registered removable memory information, the CPU 180 determines that no removable memory has been newly mounted on the image processing apparatus 200 (NO to the step S6201), and the process returns to the step S6201.

When a removable memory has been mounted on the image processing apparatus 200, the CPU 180 performs the following process: The CPU 180 refers to the write execution count 5104 of the removable memory information 5100, and determines whether or not image data is written after mounting of the removable memory (step S6202). If the write execution count is equal to 0, the process proceeds to a step S6204, whereas if the write execution count is not equal to 0, the process proceeds to a step S6203.

If the write execution count is not equal to 0, the CPU 180 forms data of a selected destination display screen in which the destination box is made blank (step S6203), and then the process proceeds to a step S6206. If the write execution count is equal to 0, the CPU 180 refers to the read/print execution count 5105 of the removable memory information 5100, to determine whether or not image data has been read and printed or only read after mounting of the removable memory (step S6204). If the read/print execution count is equal to 0, the process proceeds to a step S6205. If the read/print execution count is not equal to 0, the process returns to the step S6203.

If the read/print execution count is equal to 0, the CPU 180 sets the destination selection flag 5006 for the removable memory which is determined to be newly mounted to 1 in the address book 5000. Further, the CPU 180 refers to the removable memory information 5100, to form data of the selected destination display screen such that information on the removable memory is displayed in the destination box. Furthermore, when the remaining memory capacity of the removable memory is smaller than a predetermined value, or when the status information is not indicative of the normal status of the removable memory, the CPU 180 forms data of the destination box on the selected destination display screen such that the display of the removable memory is grayed out in a manner distinct from normal display (step S6205).

Then, the CPU 180 delivers the selected destination display screen data to the operating section 202 via the operating section I/F 130 (step S6206). This causes the selected destination display screen (FIG. 13) to be displayed on the operating section 202, and then the present process is terminated.

As described above, when a transmission screen is displayed, the CPU 180 checks the mounting of a removable memory on the image processing apparatus 200, and the write execution count and the read/print execution count of the removable memory.

When the write execution count or the read/print execution count of the removable memory is not equal to 0, it is considered that the removable memory has already been used for some other purpose. Therefore, it is considered that the removable memory was mounted by another user, who forgot to remove the removable memory after using the same. The removable memory that has already been mounted on the image processing apparatus 200 is not a removable memory brought by the user who is about to execute transmission processing, and therefore the removable memory is not set to a transmission destination.

On the other hand, when the write execution count and the read/print execution count of a removable memory are both equal to 0, the removable memory is considered to be one mounted by a user who is about to instruct transmission. In such a case, the removable memory is set to a transmission destination.

This makes it possible to detect whether or not a user continues to hold a removable memory in a drive of the image processing apparatus 200, thereby enabling the image processing apparatus 200 to positively determine that the user is a user who uses the removable memory as a transmission destination of image data. Further, the removable memory is automatically registered as a destination, and is automatically displayed in the destination box of the selected destination display screen, whereby it is possible to reduce the possibility of an error in the setting of a destination and the trouble of setting operations.

Figure 16:
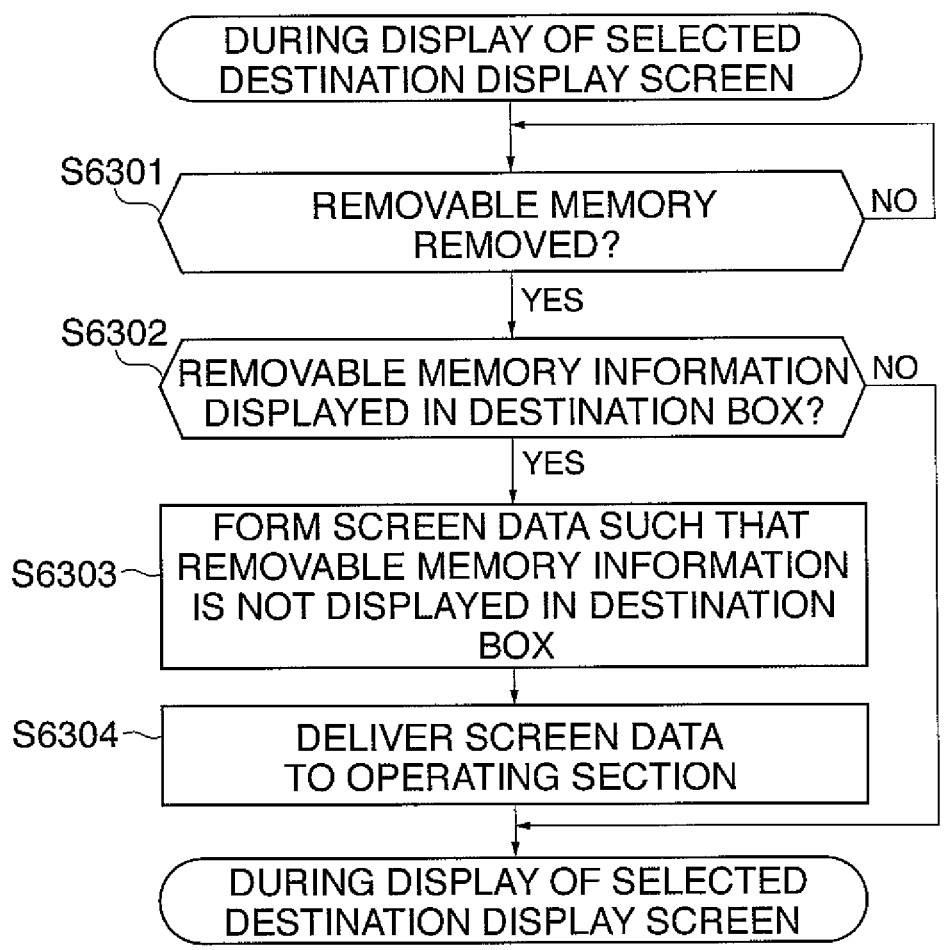
FIG. 16 is a flowchart of a display control process executed when a removable memory is removed during display of the selected destination display screen of the image processing apparatus.

FIG. 16 is a flowchart of a display control process executed when a removable memory is removed during display of the selected destination display screen of the image processing apparatus 200.

As shown in FIG. 16, the CPU 180 of the image processing apparatus 200 makes the following determination in a step S6301 in a state in which the selected destination display screen is displayed on the operating section 202. The CPU 180 checks whether or not the hardware ID of a removable memory displayed in the destination box currently displayed on the selected destination display screen exists in the address book 5000.

If the hardware ID of the removable memory does not exist in the address book 5000, the CPU 180 determines that the removable memory has been removed from the image processing apparatus 200 (YES to a step S6301), and the process proceeds to a step 6302. If the hardware ID of the removable memory exists in the address book 5000, the CPU 180 determines that the removable memory has not been removed from the image processing apparatus 200 (NO to the step S6301), and the process returns to the step S6301.

If the hardware ID of the removable memory does not exist in the address book 5000, the CPU 180 determines that the removable memory has been removed from the image processing apparatus 200 (YES to a step S6301), and the process proceeds to a step 6302. If the hardware ID of the removable memory exists in the address book 5000, the CPU 180 determines that the removable memory has not been removed from the image processing apparatus 200 (NO to the step S6301), and the process returns to the step S6301.

When the removable memory has been removed from the image processing apparatus 200, the CPU 180 determines whether or not information on the removed removable memory is being displayed in the destination box of the selected destination display screen (step S6302). When the information on the removed removable memory is being displayed in the destination box, the process proceeds to a step S6303, whereas if the information on the removed removable memory is not being displayed in the destination box, the present process is terminated.

When the information on the removed removable memory is being displayed in the destination box of the selected destination display screen, the CPU 180 forms data of the selected destination display screen such that information on the removable memory, which has been confirmed to be removed, is not displayed in the destination box (step S6303) Then, the CPU 180 delivers the selected destination display screen data to the operating section 202 via the operating section I/F 130 (step S6304). This causes the selected destination display screen to be displayed on the operating section 202, and the present process is terminated.

As described above, it is detected that the removable memory has been removed from the image processing apparatus 200, whereby it is possible for the image processing apparatus 200 to determine that the user is a user who does not set the removable memory to a destination. As a result, since removable memory information not required in determining a destination is not displayed, it is possible to reduce the possibility of an error in the setting of a destination and the trouble of setting operations.

Figure 17:
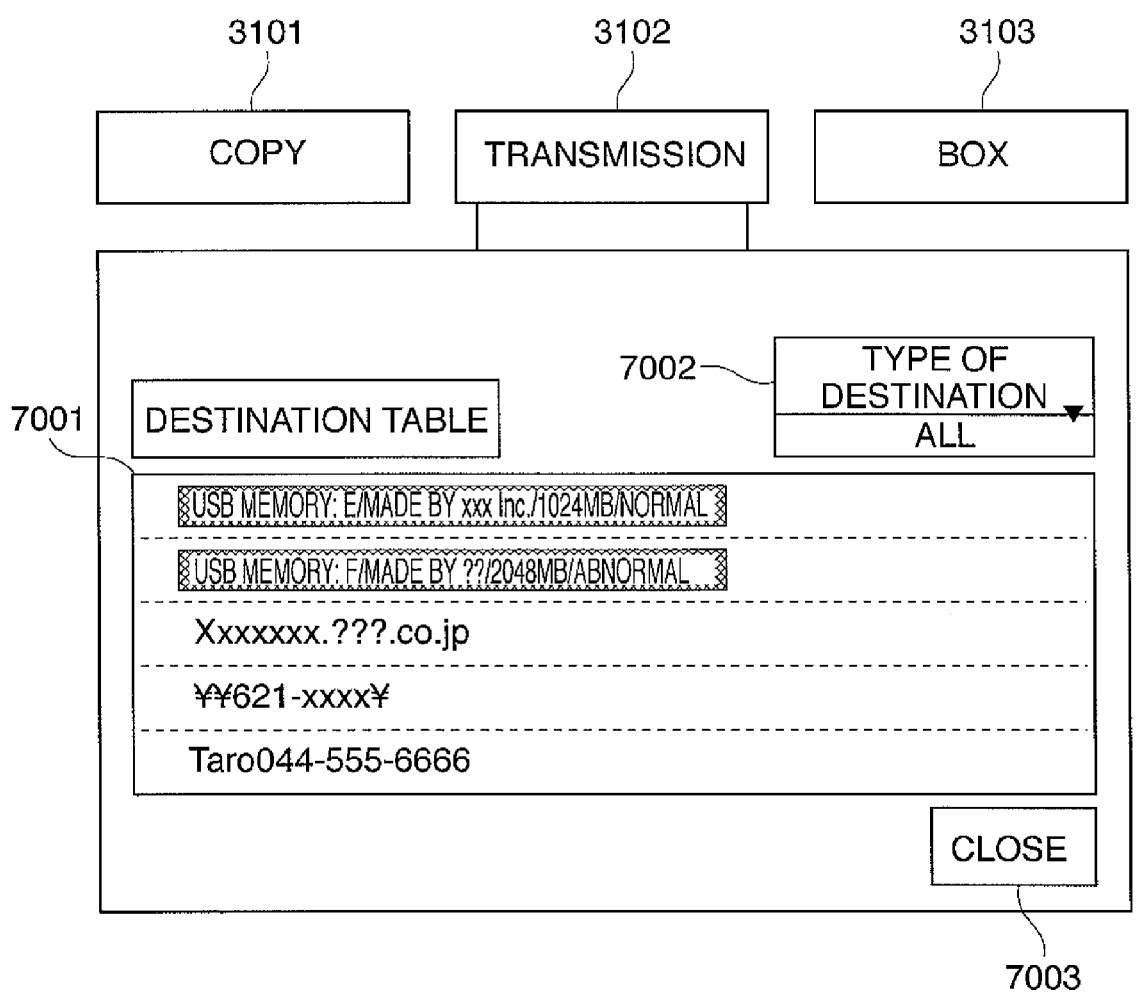
FIG. 17 is a view of a transmission destination table screen of the image processing apparatus.

FIG. 17 is a view of the transmission destination table screen of the image processing apparatus 200.

As shown in FIG. 17, the transmission destination table screen is displayed on the LCD display unit 2801 of the operating section 202 when the destination table button 3108 is selected on the selected destination display screen (FIG. 13). It is possible to set a transmission destination on the transmission destination table screen. A destination table list 7001 displays destinations of Fax transmission, IFAX transmission, E-mail transmission, file transfer by FTP, file transfer by SMB, removable media, and so forth, according to the type of destination.

A destination type 7002 includes Fax, IFAX, E-mail, FTP, SMB, removable media, and all. It is possible to narrow down the destinations from the destination type 7002, and "all" is a default setting. When predetermined conditions (that a removable memory is mounted, the write execution count is equal to 0, and the read/print execution count is equal to 0), referred to hereinafter, are satisfied, a removable memory is automatically displayed at a first position in the destination table under the control of the CPU 180. When the close button 7003 is depressed, the screen returns to the selected destination display screen.

Figure 18:
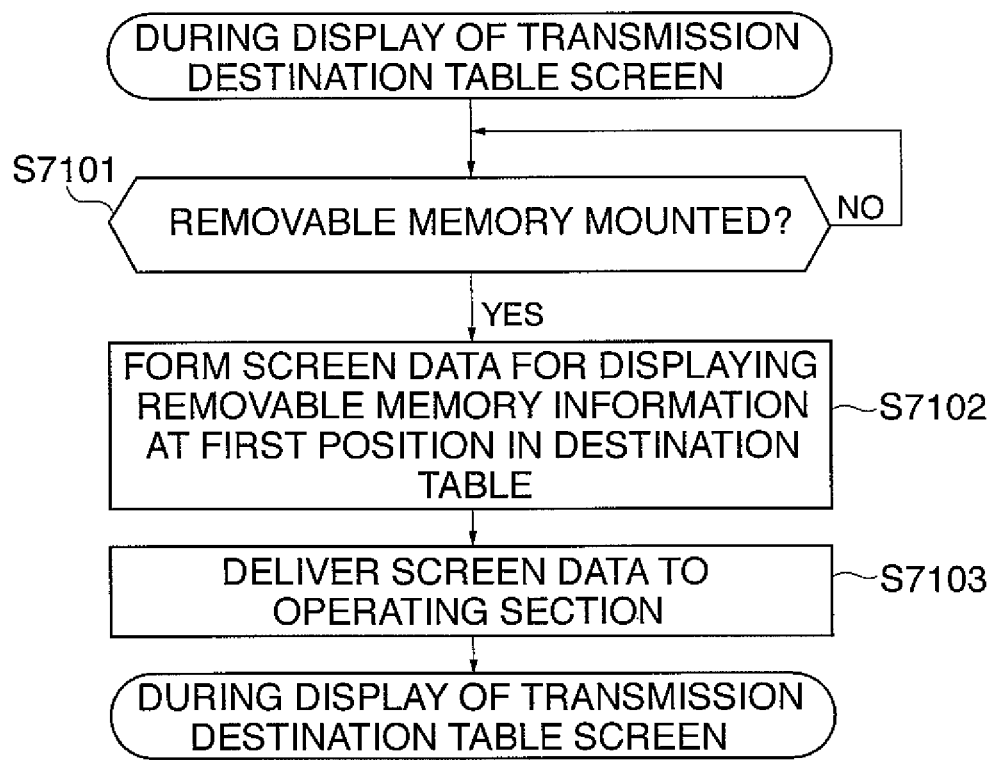
FIG. 18 is a flowchart of a display control process executed when a removable memory is mounted during display of the transmission destination table screen of the image processing apparatus.

FIG. 18 is a flowchart of a display control process executed when a removable memory is mounted during display of the transmission destination table screen of the image processing apparatus 200.

As shown in FIG. 18, the CPU 180 of the image processing apparatus 200 makes the following determination in a step S7101 in a state in which the transmission destination table screen is displayed on the operating section 202. The CPU 180 refers to the address book 5000, to determine whether or not the address book 5000 contains undisplayed registered removable memory information in which the transmission mode 5003 is transmission to a removable memory, and at the same time the preferential display flag 5005 is equal to 1.

If there is undisplayed registered removable memory information, the CPU 180 determines that a removable memory has been newly mounted on the image processing apparatus 200 (YES to a step S7101), and the process proceeds to a step S7102. On the other hand, if there is no undisplayed registered removable memory information, the CPU 180 determines that no removable memory has been newly mounted on the image processing apparatus 200 (NO to the step S7101), and the process returns to the step S7101.

When a removable memory has been mounted on the image processing apparatus 200, the CPU 180 performs the following process: The CPU 180 refers to the removable memory information 5100, to form data of the transmission destination table screen such that information on the removable memory, which has been confirmed to be newly mounted, is displayed at a first position in the destination table. Further, when the remaining memory capacity of the removable memory is smaller than a predetermined value, or when the status information is not indicative of the normal status of the removable memory, the CPU 180 forms data of the transmission destination table screen such that the display of the removable memory is grayed out in a manner distinct from normal display (step S7102).

Then, the CPU 180 delivers the transmission destination table screen data to the operating section 202 via the operating section I/F 130 (step S7103). This causes the transmission destination table screen (FIG. 17) to be displayed on the operating section 202, and then the present process is terminated.

As described above, when the transmission destination table screen is being displayed, mounting of a removable memory on the image processing apparatus 200 is detected. This enables the image processing apparatus 200 to determine that the user is a user who uses the removable memory as a transmission destination of image data. Further, the removable memory is automatically registered as a destination, and is automatically displayed at a first position in the destination table on the transmission destination table screen, which makes it possible to reduce the possibility of an error in the setting of a destination and the trouble of setting operations.

Figure 19:
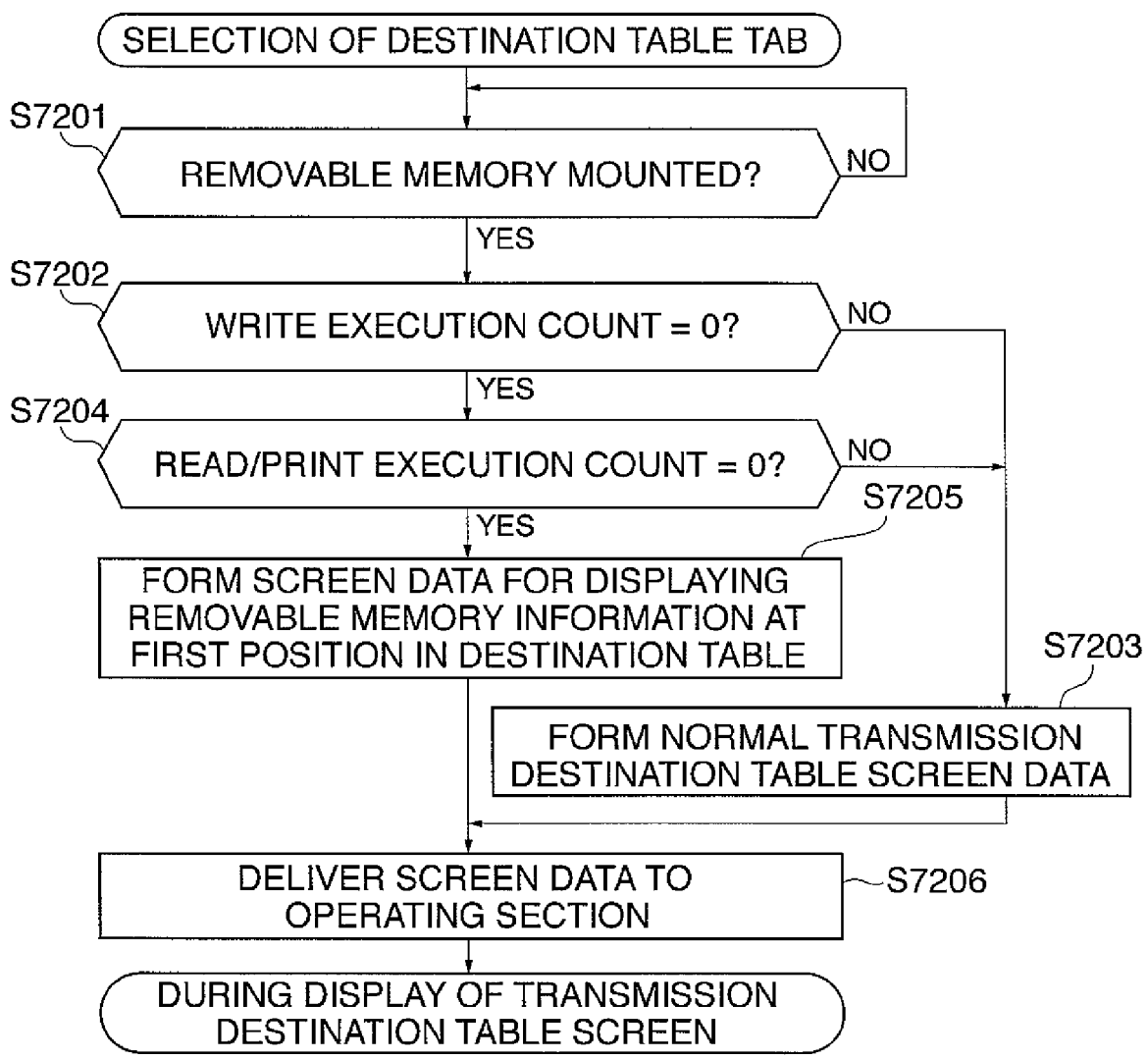
FIG. 19 is a flowchart of a control process executed when the transmission destination table screen is displayed in a state in which a removable memory has already been mounted on the image processing apparatus.

FIG. 19 is a flowchart of a control process executed when the transmission destination table screen is displayed in a state in which a removable memory has already been mounted on the image processing apparatus 200.

Referring to FIG. 19, the CPU 180 of the image processing apparatus 200 makes the following determination in a step S7201 when the user depresses the destination table tab on the transmission destination table screen: The CPU 180 refers to the address book 5000, to determine whether or not the address book 5000 contains undisplayed registered removable memory information in which the transmission mode 5003 is transmission to a removable memory, and at the same time the preferential display flag 505 is equal to 1.

If there is undisplayed registered removable memory information, the CPU 180 determines that a removable memory has been newly mounted on the image processing apparatus 200 (YES to a step S7201), and the process proceeds to a step S7202. On the other hand, if there is no undisplayed registered removable memory information, the CPU 180 determines that no removable memory has been newly mounted on the image processing apparatus 200 (NO to the step S7201), and the process returns to the step S7201.

When a removable memory has been mounted on the image processing apparatus 200, the CPU 180 performs the following process: The CPU 180 refers to the write execution count 5104 of the removable memory information 5100, and determines whether or not image data is written after mounting of the removable memory (step S7202). If the write execution count is equal to 0, the process proceeds to a step S7204, whereas if the write execution count is not equal to 0, the process proceeds to a step S7203.

If the write execution count is not equal to 0 the CPU 180 forms data of the transmission destination table screen as usual (step S7203), whereafter the process proceeds to a step S7206. If the write execution count is equal to 0, the CPU 180 refers to the read/print execution count 5105 of the removable memory information 5100, to determine whether or not image data has been read and printed or only read after mounting of the removable memory (step S7204). If the read/print execution count is equal to 0, the process proceeds to a step S7205. If the read/print execution count is not equal to 0, the process returns to the step S7203.

If the read/print execution count is equal to 0, the CPU 180 sets the destination selection flag 5006 of the removable memory which has been determined to be newly mounted to 1 in the address book 5000. Further, the CPU 180 refers to the removable memory information 5100, to form data of the transmission destination table screen such that information on the removable memory is displayed at a first position in the destination table. Furthermore, when the remaining memory capacity of the removable memory is smaller than a predetermined value, or when the status information is not indicative of the normal status of the removable memory, the CPU 180 forms destination table data of the transmission destination table screen such that the display of the removable memory is grayed out in a manner distinct from normal display (step S7205).

Then, the CPU 180 delivers the transmission destination table screen data to the operating section 202 via the operating section I/F 130 (step S7206). This causes the transmission destination table screen (FIG. 17) to be displayed on the operating section 202, and then the present process is terminated.

As described above, when the transmission destination table screen is displayed, the CPU 180 checks the mounting of a removable memory on the image processing apparatus 200, and the write execution count and the read/print execution count of the removable memory. Similarly to the process of the FIG. 15 flowchart, this makes it possible to detect whether or not a user continues to hold a removable memory in a drive of the image processing apparatus 200, thereby enabling the image processing apparatus 200 to positively determine that the user is a user who uses the removable memory as a transmission destination of image data. Further, the removable memory is automatically registered as a destination, and is automatically displayed at a first position in the destination table on the transmission destination table screen, whereby it is possible to reduce the possibility of an error in the setting of a destination and the trouble of setting operations.

Figure 20:
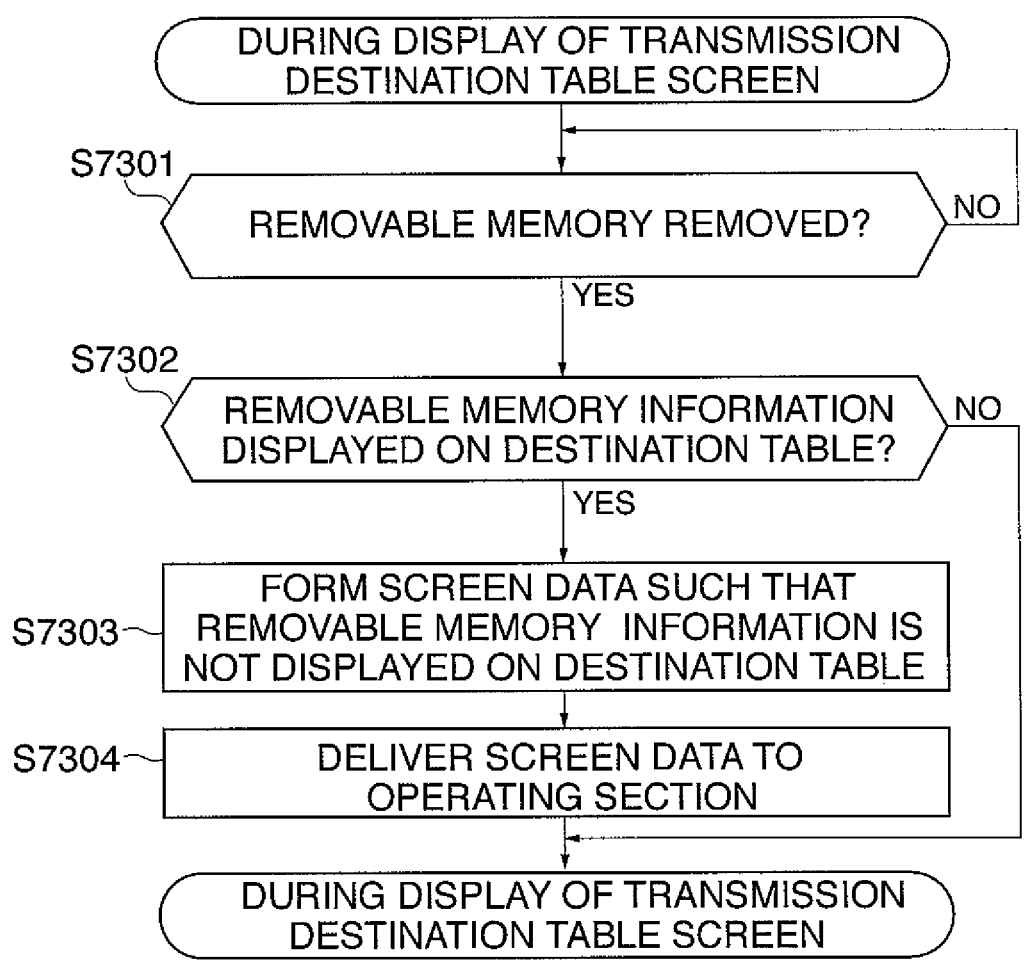
FIG. 20 is a flowchart of a display control process executed when a removable memory is removed during display of the transmission destination table screen of the image processing apparatus.

FIG. 20 is a flowchart of a display control process executed when a removable memory is removed during display of the transmission destination table screen of the image processing apparatus 200.

As shown in FIG. 20, the CPU 180 of the image processing apparatus 200 makes the following determination in a step S7301 in a state in which the transmission destination table screen is being displayed on the operating section 202. The CPU 180 checks whether or not the hardware ID of a removable memory displayed on the destination table currently displayed on the transmission destination table screen exists in the address book 5000.

If the hardware ID of the removable memory does not exist in the address book 5000, the CPU 180 determines that the removable memory has been removed from the image processing apparatus 200 (YES to a step S7301), and the process proceeds to a step 7302. On the other hand, if the hardware ID of the removable memory exists in the address book 5000, the CPU 180 determines that the removable memory has not been removed from the image processing apparatus 200 (NO to the step S7301), and the process returns to the step S7301.

If the removable memory has been removed from the image processing apparatus 200, the CPU 180 determines whether or not information on the removed removable memory is being displayed on the destination table of the transmission destination table screen (step S7302). If the information on the removed removable memory is being displayed on the destination table, the process proceeds to a step S7303, whereas if not, the present process is terminated.

If the information on the removed removable memory is being displayed on the destination table of the transmission destination table screen, the CPU 180 forms data of the transmission destination table screen such that information on the removable memory, which is confirmed to have been removed, is not displayed on the destination table (step S7303). Then, the CPU 180 delivers the transmission destination table screen data to the operating section 202 via the operating section I/F 130 (step S7304). This causes the transmission destination table screen to be displayed on the operating section 202, and then the present process is terminated.

Figure 21:
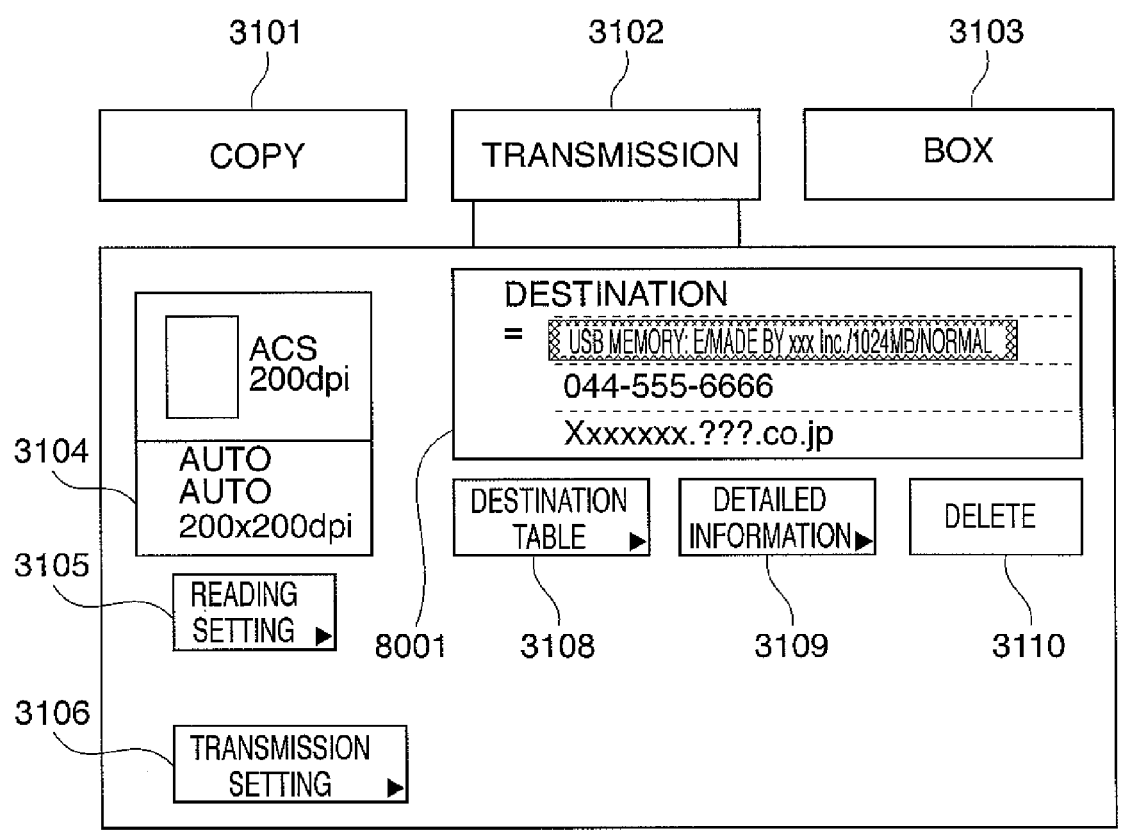
FIG. 21 is a view of a multiple destination transmission-setting screen for setting multiple transmission destinations including a removable memory mounted on the image processing apparatus and destinations to which the information is to be sent by other transmission means.

FIG. 21 is a view of a multiple destination transmission-setting screen for setting multiple transmission destinations including a removable memory mounted on the image processing apparatus and destinations to which the information is to be sent by other transmission means.

As shown in FIG. 21, in the multiple destination transmission-setting screen, the setting is performed in the same manner as normal multiple destination setting is performed. A display 8001 displays such information as displayed when a removable memory, Fax, and E-mail are selected as destinations on the transmission destination table screen (FIG. 13). At this time, the display 8001 is configured such that information on a removable memory is always displayed at a first position in the destination table. When the start key 2803 of the LCD display unit 2801 is depressed after setting the multiple destination transmission, the CPU 180 performs the following process:

The CPU 180 reads all the originals set on an original stacker, not shown, by the scanner section 203, and stores image data read by the scanner section 203 in the main memory 100. The CPU 180 transmits the image data stored in the main memory 100 to the above selected Fax transmission destinations via a modem 93. Further, the CPU 180 forms E-mail data with the image data stored in the main memory 100 attached thereto, and transmits the E-mail data to the above selected E-mail addresses via the LANC 160. Further, the CPU 180 writes the image data stored in the main memory 100, in the above selected removable memory, via the USB host I/F 140. Then, the CPU 180 deletes the image data stored in the main memory 100, followed by terminating the present process.

As described hereinabove, according to the present embodiment, when the CPU 180 of the image processing apparatus 200 has detected mounting of a removable memory on the image processing apparatus via the USB host I/F 140, the CPU 180 displays information concerning the removable memory at a first position in a list of transmission destinations. Further, when the CPU 180 has detected removal of the removable memory from the image processing apparatus via the USB host I/F 140, the CPU 180 deletes the display of the information concerning the removable memory from the transmission destination list. This makes it possible to further simplify operations required of the user who specifies a removable memory as a transmission destination of image data processed by the image processing apparatus.

Further, the CPU 180 of the image processing apparatus 200 regards an operation for transferring image data to a removable memory as part of a transmission function that the image processing apparatus originally has, and controls the operation such that the removable memory to which image data is transferred is handled as one of transmission destinations. This makes it possible to realize the operation for transferring image data to a removable memory, simply by modifying part of the transmission function of the image processing apparatus, thereby making it possible to reduce design man-hours for adding functions.

Further, the CPU 180 of the image processing apparatus 200 makes it possible to select a removable memory as one of transmission destinations, by utilizing the transmission function of the image processing apparatus, whereby it is possible to designate a removable memory as one of multiple destinations when image data is transmitted to the outside. This makes it possible to store image data transmitted from the image processing apparatus to the outside, in the removable memory, for confirmation of transmitted image data (as copy).

OTHER EMBODIMENTS

Although in the above-described embodiment, the description has been given of the control of the ScanTo removable memory function of the image processing apparatus 200 (locally connected), by way of example, this is not limitative, but the control of the ScanTo removable memory function can also be applied to the other image processing apparatuses 210 and 220 (remotely connected).

Further, although in the above-described embodiment, the transmission operation of the image processing apparatus 200 is to transmit original image data generated by reading originals using the scanner section 203, this is not limitative, but transmission of image data stored in a box (e.g. the main memory 100) may be included in an example of the transmission operation, by way of example. In this case, the process in the step S406 in FIG. 8 may be replaced by a process for reading out image data from the main memory 100.

It is to be understood that the object of the present invention may also be accomplished by supplying a system or an apparatus with a storage medium in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-340078 filed Dec. 18, 2006, which is hereby incorporated by reference herein in its entirety.

What is claimed is:

1. An image processing apparatus to which a removable storage medium for storing image data is mountable, the image processing apparatus comprising:
a scanner configured to read an image of an original to generate image data;
a first transmission unit configured to transmit the image data generated by said scanner to an external apparatus by an E-mail;
a second transmission unit configured to transmit the image data generated by said scanner to the removable storage medium mounted to the image processing apparatus;
a mount determination unit configured to determine whether or not the removable storage medium has been mounted; and
a display control unit configured to:
change display information displayed by a display device for displaying information concerning transmission based on whether said mount determination unit determines whether or not the removable storage medium has been mounted; and
control the display device to display, according to said mount determination unit determining that the removable storage medium has been mounted, a list of the information concerning said first transmission unit and the information concerning said second transmission unit so that the information concerning said second transmission unit is ranked higher than the information concerning said first transmission unit.

2. The image processing apparatus as claimed claim 1, wherein:
the information concerning transmission is a list of transmission destinations, and
the information concerning said second transmission unit is displayed at a first position in the list of transmission destinations, according to said mount determination unit determining that the removable storage medium has been mounted.

3. The image processing apparatus as claimed in claim 2, wherein said display control unit controls the display device to delete display of the information concerning said second transmission unit from the list of transmission destinations, according to said mount determination unit determining that the removable storage medium has not been mounted.

4. The image processing apparatus as claimed in claim 3, further comprising:
an information storage unit configured to store information concerning a number of times of writing of image data in the removable storage medium after mounting of the removable storage medium, a number of times of reading of image data from the removable storage medium after the mounting of the removable storage medium, a remaining capacity of the removable storage medium, and a state of the removable storage medium, so that the information is updated in a case where the removable storage medium has been mounted or removed; and
a registration control unit configured to store information concerning the removable storage medium in said information storage unit, and register the information in an address book, according to said mount determination unit determining that the removable storage medium has been mounted, said registration control unit deleting the information concerning the removable storage medium from said information storage unit and said address book, according to said mount determining unit determining that the removable medium has not been mounted.

5. The image processing apparatus as claimed in claim 1, wherein said display control unit controls the display device to display the information concerning said second transmission unit differently from normal display according to a remaining capacity of the removable storage medium being smaller than a predetermined value, or according to the removable storage medium being not in a normal state.

6. The image processing apparatus as claimed in claim 1, further comprising a third transmission unit configured to transmit the image data via at least one of transmission of the image data from modes of transmission including facsimile transmission, internet facsimile transmission, file transfer by FTP, or file transfer by SMB.

7. The image processing apparatus as claimed in claim 1, wherein according to the transmission to the removable storage medium and the transmission to the external device being selected, said second transmission unit transmits the image data generated by said scanner to the removable storage medium and said first transmission unit transmits the image data to the external device.

8. The image processing apparatus as claimed in claim 1, wherein:
the information concerning transmission is a list of transmission destinations, and
accord to said mount determining unit determining that the removable storage medium has been mounted, the list of transmission destinations to which information concerning said second transmission unit is automatically updated.

9. The image processing apparatus as claimed in claim 1, wherein the screen serves for selecting a transmission destination of image data by said first transmission unit or said second transmission unit, and said display control unit controls the display device to display identification information of the mounted removable medium in preference to E-mail address according to said mount determination unit determining that the removable storage medium has been mounted.

10. The image processing apparatus as claimed in claim 1, further comprising:
a determination unit configured to determine whether or not image data is written to the removable storage medium after mounting of the removable storage medium,
wherein said display control unit controls the display device to not display information concerning said second transmission unit according to said determination unit determining that the data is written to the removable storage medium.

11. The image processing apparatus as claimed in claim 1, further comprising:
a determination unit configured to determine whether or not image data is read out from the removable storage medium,
wherein said display control unit controls the display device to not display information concerning said second transmission unit according to said determination unit determining that the data is read out from the removable storage medium.

12. A method of controlling an image processing apparatus to which a removable storage medium for storing image data is mountable, the image processing apparatus including a scanner configured to read an image of an original to generate image data, a first transmission unit configured to transmit the image data generated by the scanner to an external apparatus by an E-mail, and a second transmission unit configured to transmit the image data generated by the scanner to the removable storage medium mounted to the image processing apparatus, the method comprising:
a mount determination step of determining whether or not the removable storage medium has been mounted; and
display control steps of:
changing display information displayed by a display device for displaying information concerning transmission based on whether the mount determination step determines whether or not the removable storage medium has been mounted; and
controlling the display device to display, according to the mount determination step determining that the removable storage medium has been mounted, a list of the information concerning the first transmission unit and the information concerning the second transmission unit so that the information concerning the second transmission unit is ranked higher than the information concerning the first transmission unit.

13. A non-transitory storage medium storing a program executable by a processor of an image processing apparatus to control the image processing apparatus to which a removable storage medium for storing image data is mountable, the image processing apparatus including a scanner configured to read an image of an original to generate image data, a first transmission unit configured to transmit the image data generated by the scanner to an external apparatus by an E-mail, and a second transmission unit configured to transmit the image data generated by the scanner to the removable storage medium mounted to the image processing apparatus, the program comprising:
a mount determination module configured to determine whether or not the removable medium has been mounted; and
a display control module configured to:
change display information displayed by a display device for displaying information concerning transmission based on whether the mount determination module determines whether or not the removable storage medium has been mounted; and
control the display device to display, according to the mount determination module determining that the removable storage medium has been mounted, a list of the information concerning the first transmission unit and the information concerning the second transmission unit so that the information concerning the second transmission unit is ranked higher than the information concerning the first transmission unit.

* * * * *